US011155732B2

(12) United States Patent
Rabnawaz et al.

(10) Patent No.: US 11,155,732 B2
(45) Date of Patent: Oct. 26, 2021

(54) BIODEGRADABLE OMNIPHOBIC COATED ARTICLES AND METHOD FOR MAKING

(71) Applicant: BOARD OF TRUSTEES OF MICHIGAN STATE UNIVERSITY, East Lansing, MI (US)

(72) Inventors: Muhammad Rabnawaz, East Lansing, MI (US); Zhao Li, Sherman Oaks, CA (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 0 days.

(21) Appl. No.: 17/269,484

(22) PCT Filed: Aug. 21, 2019

(86) PCT No.: PCT/US2019/047409
§ 371 (c)(1),
(2) Date: Feb. 18, 2021

(87) PCT Pub. No.: WO2020/041409
PCT Pub. Date: Feb. 27, 2020

(65) Prior Publication Data
US 2021/0253901 A1 Aug. 19, 2021

Related U.S. Application Data

(60) Provisional application No. 62/746,087, filed on Oct. 16, 2018, provisional application No. 62/720,615, filed on Aug. 21, 2018.

(51) Int. Cl.
| | | |
|---|---|---|
| *C09D 183/08* | (2006.01) | |
| *B05D 5/08* | (2006.01) | |
| *B05D 3/02* | (2006.01) | |
| *B05D 7/00* | (2006.01) | |
| *B05D 7/02* | (2006.01) | |

(52) U.S. Cl.
CPC ............ *C09D 183/08* (2013.01); *B05D 3/02* (2013.01); *B05D 5/08* (2013.01); *B05D 7/02* (2013.01); *B05D 7/52* (2013.01)

(58) Field of Classification Search
None
See application file for complete search history.

(56) References Cited

U.S. PATENT DOCUMENTS

| | | |
|---|---|---|
| 6,517,933 B1 | 2/2003 | Soane et al. |
| 7,820,563 B2 | 10/2010 | Soane et al. |
| 2007/0059273 A1 | 3/2007 | Price et al. |
| 2009/0018262 A1* | 1/2009 | Licht .................... C09D 175/04 524/591 |
| 2011/0240064 A1 | 10/2011 | Wales et al. |
| 2014/0342954 A1* | 11/2014 | Ingber .................... A61L 29/14 508/100 |
| 2016/0129400 A1* | 5/2016 | Tuteja .................... C10G 21/00 210/650 |
| 2016/0200937 A1 | 7/2016 | Hu et al. |
| 2016/0251803 A1* | 9/2016 | Tuteja ...................... C09D 5/00 428/311.71 |
| 2017/0022371 A1* | 1/2017 | Lynn .................... C09D 5/1625 |
| 2017/0107413 A1* | 4/2017 | Wang .................... C09D 183/00 |
| 2017/0204291 A1* | 7/2017 | Berry .................... C08G 77/24 |
| 2018/0037848 A1* | 2/2018 | Schubert .............. C11D 3/2093 |

FOREIGN PATENT DOCUMENTS

| | | | |
|---|---|---|---|
| CA | 2 799 786 | 12/2011 | |
| CA | 2799786 A1 * | 12/2011 | ........... B32B 27/288 |
| EP | 2977397 A1 * | 1/2016 | ............. D21H 19/12 |
| WO | WO-2014149465 A1 * | 9/2014 | ............. D21H 27/00 |
| WO | WO-2019/099608 A1 | 5/2019 | |

OTHER PUBLICATIONS

International Application No. PCT/US2019/047409, International Search Report and Written Opinion, dated Nov. 19, 2019.

* cited by examiner

*Primary Examiner* — William P Fletcher, III
(74) *Attorney, Agent, or Firm* — Marshall, Gerstein & Borun LLP

(57) ABSTRACT

The disclosure relates to omniphobic coatings, related articles including such coatings, and related method for forming such coatings or articles, for example biobased and/or biodegradable omniphobic coatings. The omniphobic coating includes a reaction product between an amino-functional polymer and an amino-reactive functionalized omniphobic polymer having a glass transition temperature ($T_g$) of 60° C. or less. The omniphobic coating has a weight ratio of amino-functional polymer relative to functionalized omniphobic polymer of at least 1 or 2. A corresponding omniphobic coated article can include the omniphobic coating on a porous substrate such as a cellulosic or paper substrate, for example to provide a water- and oil/fat/grease-resistant coating for a paper-based product. The omniphobic coating can be formed in a reaction medium before being applied to the substrate, or the omniphobic coating can be formed on the substrate with serial application of the amino-reactive functionalized omniphobic polymer and the amino-functional polymer thereon. This disclosure provides a closed loop circular economy approach for fluorine-free, water- and grease-resistant paper as the coating can be easily separated from the pulp/fiber of the paper. The recycled pulp can be used for paper making, while the separated coating in micelle form can be used for recoating.

41 Claims, 5 Drawing Sheets

(A)

(B)

BIODEGRADABLE OMNIPHOBIC COATED ARTICLES AND METHOD FOR MAKING

CROSS-REFERENCE TO RELATED APPLICATIONS

This is a National Stage of International Application No. PCT/US2019/047409, filed Aug. 21, 2019, which claims the benefit of U.S. Provisional Application No. 62/720,615 (filed Aug. 21, 2018) and U.S. Provisional Application No. 62/746,087 (filed Oct. 16, 2018), which are incorporated herein by reference in their entireties.

STATEMENT OF GOVERNMENT INTEREST

None.

BACKGROUND OF THE DISCLOSURE

Field of the Disclosure

The disclosure relates to omniphobic coatings, related articles including such coatings, and related method for forming such coatings or articles, for example biobased and/or biodegradable omniphobic coatings. The omniphobic coating includes a reaction product between an amino-functional polymer comprising and an amino-reactive functionalized omniphobic polymer having a glass transition temperature ($T_g$) of 60° C. or less. A corresponding omniphobic coated article can include the omniphobic coating on a porous substrate such as a cellulosic or paper substrate, for example to provide a water- and oil/fat/grease-resistant coating for a paper-based product.

Brief Description of Related Technology

When water accumulates on a surface, the surface energy of the material is directly related to how the water will react. Some surfaces may allow the water to spread out into a pool with a large surface area, whereas others may make water bead up into droplets. The contact angle between the water droplet and the surface is used to characterize the surface into three categories: hydrophilic (<90°), hydrophobic (90°-150°), and superhydrophobic (>150°). FIG. 1 is a visual representation of a contact angle measurement.

Hydrophobicity can be achieved in two ways: controlling the chemical interactions between water and the material surface or altering the surface of the material. Generally, non-polar molecular groups are responsible water beading on a surface as opposed to spreading, due to the lower surface energies exhibited by non-polar groups. A lower surface energy of the material will directly relate to a high contact angle. In contrast, high-energy materials will cause water to spread out in a thin pool, as the polar groups present in surfaces with high energies attract the polar water molecules.

Physically altering the surface (e.g., increasing the roughness thereof) of the material may also increase the hydrophobicity of a material. By creating pillars or other similar features on a textured surface, water interacts with an increased surface area on the material, thus amplifying the chemical interactions between water and the surface. An image depicting how texturing the surface leads to increased contact angle can be seen below in FIG. 2. The use of a rough surface with nano-wells such as in FIG. 2 prevents water droplets from entering etched grooves. However, under a high enough pressure, the water will still disperse into the wells and such coatings are expensive and difficult to manufacture. Another method (not shown) utilizes a sponge coating that is doped with a hydrophobic material to prevent water dispersion. The sponge method works well at repelling water, but is not a durable material and will eventually degrade. Both of the previous methods generally either lack the feature of optical transparency or require costly additional steps and/or components to provide optical transparency. Optical transparency is key for the coating to allow for coated materials to still be visible.

A material that repels oils is known as oleophobic or lipophobic depending on if the repelling action is a physical or chemical property, respectively, and operates analogously to hydrophobic materials. These materials are often used on touch screen displays so that bodily oils and sweat gland secretions do not build up on the surface of a screen. A material that exhibits both hydrophobic and oleophobic properties is known as omniphobic. Such materials with very high contact angles are often regarded as "self-cleaning" materials, as contaminants will typically bead up and roll off the surface. As such, these materials have possible applications in screen display, window, and building material coatings.

In recent years, there have been significant efforts to reduce or eliminate the amount of plastic that the general public utilizes, in particular for disposable food-service items. For example, announcements and pledges to cease the use of plastic straws, plates, and cutlery are prevalent; however, there is often little thought as to solutions for replacements. In some cases, replacements might not themselves be environmentally friendly (e.g., non-biodegradable), or require further expensive processing to become environmentally friendly. Paper coated with biodegradable polymers may offer a solution; however, many coatings contain fluorine which have environmental and personal health hazards. Others may be repellent to water, but perform poorly for oil repellency. Natural coatings, such as wax paper, are biodegradable, sustainable, and safe for food packaging purposes; however, they suffer from poor mechanical durability and will easily break from the paper.

Paper products are widely used materials in the packaging, labelling, and printing industry due to their relatively low cost, renewable feedstocks and biodegradable nature. Despite these advantages, paper and paper-based materials have limited use to their poor water resistance and grease/oil resistance. To improve water resistance, various approaches have been applied including paper sizing, physico-chemical modification (plasma etching, etc.), chemical modification (e.g., grafting approach, layer-by-layer, etc.). However, most of these techniques are not useful for practical large-scale production for one or more reasons including time-consuming processes, the use of costly raw materials, and reliance on environmentally harmful chemicals. Also, in these cases, the separation of the pulp from the fabricated paper is challenging.

Lamination and waxing of paper are common industrial approaches for water and oil-resistant paper fabrications. For example, LDPE is used as liner for disposable cups and plates that prevents the direct contact between a food/beverages and the paper. Waxed paper is used for meat and other food packing applications, however, wax has poor crack- and thermal-resistance, thus is limited to certain applications. A key challenge with the use of laminated- and waxed-paper is the paper recyclability after use. Consequently, these laminated and waxed papers become municipal solid waste (MSW).

As an alternative to LDPE, polylactic acid (PLA) is also used as an liner for paper cups and plates. However, PLA and paper cellulose biodegrade in different environments because PLA is compostable in an industrial set up at a temperature of 60° C. Also, polyaleuritates, which are biodegradable polymers, have been applied onto cellulose by melt-processing, and subsequent addition of carnauba wax to improve the water and oxygen barrier properties. However, in both cases, the coated substrates were not oil resistant. Although the use of biodegradable plastic for paper lamination is helpful to reduce environmental footprint, it does not address the sustainable closed loop circular economy approach because paper is not recycled.

The commercially available AEGLE BARRIER LIGHT paper is free from harmful fluorochemicals or waxes, but instead it relies on the use of synthetic non-degradable styrene-butadiene latex. These water-borne latex coated paper have polar groups, which make them less effective against water-borne products for relatively longer duration. Also, the use of latex has migration concerns from coated paper into the product. Monomers can also be trapped in latex that can create health concerns. The separation of latex from the paper will lead to the disposal of latex into the environment that may have adverse effects on animals.

Fluorinated polymers are used to render paper strong water- and oil-resistant desirable for applications such as disposable plates and fast food wrappers. Although fluorochemicals render excellent water resistance due to their low surface energies, their cost, toxicity, and environmental concerns have created push to phase out fluorine from paper coatings. Alternatively, polysiloxanes, particularly polydimethyl siloxane (PDMS), have attracted great attention due to their affordable cost and environmental friendliness. PDMS has a lower surface energy (e.g., 20 mN/m) than other fluorine-free polymers (e.g., 31.6 mN/m for polyethylene), but still higher than perfluoroalkyls (e.g., 6.5 mN/m). As a result, PDMS coated paper is water resistant, while oil permeates into the pores of the paper because the surface energy of PDMS is not sufficiently low to stop oil migration/diffusion into the porous paper.

Hu et al. U.S. Publication No. 2016/0200937 discloses polyurethane-based and epoxy-based compositions that be used as coatings and adhesives with abrasion-resistant, ink-resistant, anti-graffiti, anti-fingerprint properties. The disclosed process for making the compositions requires graft and block copolymer components along with a two-step/two-pot manufacturing process, increasing the time to manufacture and cost of the product.

SUMMARY

In one aspect, the disclosure relates to a method for forming an omniphobic coated article, the method comprising: providing a porous (e.g., cellulosic) substrate; and applying an omniphobic (polymeric) coating to the porous substrate, the omniphobic polymeric coating comprising a reaction product between (i) an amino-functional polymer comprising a plurality of amino groups (e.g., as pendant or backbone groups on/in polymeric repeat units) and (ii) at least one functionalized omniphobic polymer having a glass transition temperature ($T_g$) of 60° C. (or 50° C.) or less (e.g., PDMS, plant oil), the functionalized omniphobic polymer comprising a functional group (e.g., isocyanate, epoxy, vinyl, aldehyde, and anhydride groups) reactive with the amino groups of the amino-functional polymer. The omniphobic coating has a weight ratio of amino-functional polymer relative to functionalized omniphobic polymer of at least 0.5, 1, or 2, such as in a range from 2 to 20. More generally, the ratio can be at least 0.5, 1, 2, 3, 4, 5, or 8 and/or up to 3, 4, 5, 7, 10, 12, 15, or 20 for the weight amino-functional polymer (such as chitosan):weight functionalized omniphobic polymer (such as PDMS) in the omniphobic coating.

In another aspect, the disclosure relates to an omniphobic coated article, comprising: a porous (e.g., cellulosic) substrate; and an omniphobic coating on the porous substrate formed by the above method in any of its variously disclosed embodiments and refinements.

In another aspect, the disclosure relates to an omniphobic coated article comprising: a porous (e.g., cellulosic) substrate; and an omniphobic (polymeric) coating on the porous substrate (e.g., adhered thereto and at least partially filling substrate pores), the omniphobic polymeric coating comprising a reaction product between (i) an amino-functional polymer comprising a plurality of amino groups (e.g., as pendant or backbone groups on/in polymeric repeat units) and (ii) at least one functionalized omniphobic polymer having a glass transition temperature ($T_g$) of 60° C. (or 50° C.) or less (e.g., PDMS, plant oil), the functionalized omniphobic polymer comprising a functional group (e.g., isocyanate, epoxy, vinyl, aldehyde, and anhydride groups) reactive with the amino groups of the amino-functional polymer. The omniphobic coating has a weight ratio of amino-functional polymer relative to functionalized omniphobic polymer of at least 0.5, 1 or 2, such as in a range from 2 to 20. More generally, the ratio can be at least 0.5, 1, 2, 3, 4, 5, or 8 and/or up to 3, 4, 5, 7, 10, 12, 15, or 20 for the weight amino-functional polymer (such as chitosan):weight functionalized omniphobic polymer (such as PDMS) in the omniphobic coating.

In another aspect, the disclosure relates to a method for forming an omniphobic coated article, the method comprising: providing an aqueous dispersion comprising omniphobic polymeric micelles dispersed therein, the omniphobic polymeric micelles comprising a reaction product between (i) an amino-functional polymer comprising a plurality of amino groups (e.g., as pendant or backbone groups on/in polymeric repeat units) and (ii) at least one functionalized omniphobic polymer having a glass transition temperature ($T_g$) of 60° C. (or 50° C.) or less (e.g., PDMS, plant oil), the functionalized omniphobic polymer comprising a functional group (e.g., isocyanate, epoxy, vinyl, aldehyde, and anhydride groups) reactive with the amino groups of the amino-functional polymer; applying the aqueous dispersion comprising the omniphobic polymeric micelles to a porous (e.g., cellulosic) substrate; and drying the porous substrate, thereby forming an omniphobic (polymeric) coating comprising the reaction product on the porous substrate. The micelles and corresponding reaction product are generally amphiphilic in nature, having a water-soluble portion (e.g., from the amino-functional polymer) and a water-insoluble portion (e.g., from the functionalized omniphobic polymer), which two portions promote micelle formation in an aqueous medium. The micelles are omniphobic polymeric micelles because the amphiphilic micelles form an omniphobic polymeric coating after application to a porous substrate and drying. In a particular refinement, the omniphobic coating (e.g., and the micelle reaction product precursor thereof) can have a weight ratio of amino-functional polymer relative to functionalized omniphobic polymer of at least 0.5, 1, or 2, such as in a range from 2 to 20. More generally, the ratio can be at least 0.5, 1, 2, 3, 4, 5, or 8 and/or up to 3, 4, 5, 7, 10, 12, 15, or 20 for the weight amino-functional polymer (such as chitosan):weight functionalized omniphobic polymer (such as PDMS) in the omniphobic coating. The omniphobic polymeric micelles are oriented with a hydrophilic portion outward and hydrophobic portion inward. The hydrophobic portion corresponds to the functionalized omniphobic polymer (e.g., PDMS, plant oil). The hydrophilic portion corresponds to the amino-functional polymer (e.g., chitosan, PEI), which has at least some hydrophilic groups. The hydrophilic groups can include unreacted amino groups (e.g., in unprotonated amine form or protonated ammonium form), and suitably further include one or more other groups such as hydroxyl groups, carboxylic groups, etc. In the case of chitosan as the amino-functional polymer, the hydrophilic groups providing stable aqueous micelles include hydroxyl groups and possibly unreacted amino groups (e.g., depending on degree of functionalization with the functionalized omniphobic polymer). Micelles are suitably formed at acidic conditions (e.g., pH of 5 or less or 6 or less) or basic conditions (e.g., pH of 8 or more or 9 or more). The acidic or basic conditions promote micelle formation by promoting the water solubility of the amino-functional polymer portion of the graft reaction product (e.g., chitosan, which is readily water-soluble at low and high pH values). Suitable weight ratios for the hydrophilic portion (amino-functional polymer) and hydrophobic portion (functionalized omniphobic polymer) in the micelle-forming omniphobic polymer can range from 1:2 to 1:0.1 for hydrophilic:hydrophobic portions (e.g., up to 1:1, 1:1.2, 1:1.5, or 1:2 and/or at least 1:0.1, 1:0.2, 1:0.4, 1:0.6, or 1:1). The aqueous dispersion generally includes the omniphobic polymeric micelles at a concentration of 0.1 wt. % to 10 wt. %.

Applying the aqueous dispersion to the substrate can include dip coating, spraying, using a drawdown bar (e.g., wire wound applicator), etc. Drying removes the water (and any other co-solvents present), during which process the omniphobic polymeric micelles structurally re-orient themselves such that the hydrophilic portion generally fills the pores of the porous substrate, thereby imparting oil resistance to the coated substrate, and the hydrophobic portion is generally at the outer, exposed or external surface of the coating, thereby imparting water resistance to the coated substrate. When the porous substrate is a cellulosic substrate or other substrate including hydrogen bonding groups such as hydroxyl and/or amino-groups, the re-orientation of the omniphobic polymeric micelles further includes the formation of hydrogen bonds between the substrate and the omniphobic polymeric coating as a means for adhesion. Such adhesion is generally non-covalent and is reversible during recycling treatment of the coated substrate by aqueous extraction under appropriate conditions to remove and separate the omniphobic polymeric coating from the underlying substrate.

In a particular refinement, providing the aqueous dispersion comprising the omniphobic polymeric micelles dispersed therein comprises: reacting the amino groups of the amino-functional polymer with the functional groups of the functionalized omniphobic polymer in an aqueous reaction medium to form the omniphobic polymer micelle reaction product dispersed in the aqueous reaction medium. Suitably, the aqueous reaction medium has an acidic or basic pH value, for example a pH value of up to 6 or greater than 8. Reaction to form micelles can be performed in an acidic medium, for example having a pH value of at least 1, 2, 3, or 4 and/or up to 3, 4, 5, or 6, such as about 4-5 or 4-6. Reaction to form micelles can be performed in a basic medium, for example having a pH value of at least 8, 9, 10, 11, or 12 and/or up to 11, 12, 13, or 14, such as about 8-12, 8-11, or 10-12. The reaction medium generally includes water and one or more acid, base, and/or buffer components to maintain the desired pH value and promote micelle formation.

In another aspect, the disclosure relates to an omniphobic coated article, comprising: a porous (e.g., cellulosic) substrate; and an omniphobic coating on the porous substrate formed by the above method in any of its variously disclosed embodiments and refinements, in particular using an aqueous dispersion of omniphobic polymeric micelles.

In another aspect, the disclosure relates to an omniphobic coated article comprising: a porous (e.g., cellulosic) substrate; and an omniphobic (polymeric) coating on the porous substrate (e.g., adhered thereto and at least partially filling substrate pores), the omniphobic polymeric coating comprising a reaction product between (i) an amino-functional polymer comprising a plurality of amino groups (e.g., as pendant or backbone groups on/in polymeric repeat units) and (ii) at least one functionalized omniphobic polymer having a glass transition temperature ($T_g$) of 60° C. (or 50° C.) or less (e.g., PDMS, plant oil), the functionalized omniphobic polymer comprising a functional group (e.g., isocyanate, epoxy, vinyl, aldehyde, and anhydride groups) reactive with the amino groups of the amino-functional polymer; wherein the omniphobic polymeric coating is capable of forming an aqueous dispersion of micelles formed from the omniphobic polymeric coating upon aqueous extraction of the omniphobic coated article under suitable pH conditions. In a particular refinement, the omniphobic coating has a weight ratio of amino-functional polymer relative to functionalized omniphobic polymer of at least 0.5, 1 or 2, such as in a range from 2 to 20. More generally, the ratio can be at least 0.5, 1, 2, 3, 4, 5, or 8 and/or up to 3, 4, 5, 7, 10, 12, 15, or 20 for the weight amino-functional polymer (such as chitosan):weight functionalized omniphobic polymer (such as PDMS) in the omniphobic coating.

Various refinements of the disclosed methods and coated articles are possible.

In a refinement, the porous substrate comprises a porous cellulosic substrate. The method and coated articles generally can use any porous substrate, cellulosic or non-cellulosic, for example porous metal substrates, porous plastic (e.g., polymeric foam) substrates, and porous cellulosic substrates. A cellulosic substrate generally includes at least one of cellulose and hemicellulose, and it can further include lignin (e.g., as a lignocellulosic substrate).

In a further refinement, the cellulosic substrate is selected from the group of paper (bleached, unbleached, coated and uncoated), corrugated board, cardboard, wood, and fabric (or textile). More generally, the cellulosic substrate is not particularly limited, and can be formed from any cellulosic material desired for protection with an omniphobic coating, in particular given the good, broad adhesive capabilities of the omniphobic composition. For example, the substrate can be a paper, wood, or fabric (or textile). Examples of paper substrates can include generally thinner, flexible papers, for example useful as wrapping materials, as well as generally thicker, rigid papers or cardboard (e.g., corrugated paper cardboard), for example useful as box, container, plate, cup, or other storage or food-service items. Suitable wood materials can be any type of wood commonly used in home, office, and outdoor settings. Suitable fabric or textile materials can include any cellulosic materials commonly used in garments or otherwise, such as cotton, jute, flax, hemp, etc.

In a further refinement, the cellulosic substrate is in the form of a food-service article selected from the group consisting of a drinking cup, a food plate, and a food wrapper.

In a further refinement, the cellulosic substrate is in the form of a packaging box (e.g., corrugated boxes, cardboard boxes).

In a refinement, the omniphobic coating further comprises one or more additives selected from the group consisting of nanoclay, graphene oxide, graphene, silicon dioxide (silica), aluminum oxide, cellulose nanocrystals, carbon nanotubes, titanium dioxide (titania), diatomaceous earth, biocides, pigments, dyes, thermoplastics, and combinations thereof. The additives can be included in the (aqueous) coating mixture as applied to the porous (cellulosic) substrate. For example, the additives can be included in a solution or mixture containing the omniphobic (polymeric) coating (e.g., functionalized chitosan) before it is applied to the substrate. In other embodiments, the additive can be included in a solution or mixture containing the amino-functional polymer (e.g., chitosan) before it is applied to the substrate and then subsequently functionalized with the functionalized omniphobic polymer. One function of the fillers is to seal the substrate pores, in particular at relatively low levels of amino-functional polymer (e.g., chitosan) usage. For example, the inner bulk of the paper or another porous substrate may still have some trapped pores/air, but the top pores are sealed with the amino-functional polymer behaving as a sealant (or glue) along with the fillers. Without fillers, the amino-functional polymer could diffuse into the inner bulk. Also, fillers can bring color to the substrate (e.g., paper), for example using titanium dioxide filler particles as a whitening agent. Biocidal properties also can also be incorporated via nanofiber fillers.

In a refinement, amino-functional polymer comprises chitosan. The amino-functional polymer or chitosan in particular can include amino groups (e.g., and substantially no ammonium groups such as when neutralized or not in cationic form). The amino-functional polymer or chitosan in particular can include ammonium groups (e.g., and substantially no amino groups such as when acidified or in cationic form). The amino-functional polymer or chitosan in particular can include at least some amino groups and at least some ammonium groups (e.g., when partially neutralized/acidified and in partially cationic form). The amino-functional polymer or chitosan in particular can have a molecular weight in a range from 1000 to 500,000 g/mol. The degree of deacetylation of the amine in the chitosan suitably is in the range of 5% to 100%, such as between 85% and 100%. The amino-functional polymer or chitosan can be used as mixture (in different weight percent ranges such as between 5% and 99% amino-functional polymer or chitosan) with other hydrophilic polymers, such as polyvinyl alcohol (PVOH), sodium alginate, starch, water-soluble proteins, and/or polyethylene imine (PEI, such as linear or branched PEI). The hydrophilic polymers may carry amino groups (e.g., $NH_2$ or NH groups such as in PEI) or hydroxy groups (e.g., OH groups such as in polyvinyl alcohol and starch), and/or carboxylic groups (e.g., ionic COOH groups such as in sodium alginate). The amino-functional polymer can include PEI (e.g., alone or in combination with another amino-functional polymers such as chitosan), which optionally can be blended with non-amino hydrophilic polymers such as PVOH, starch, and sodium alginate. In some embodiments, the omniphobic coating is free from non-amino hydrophilic polymers. In some embodiments, the omniphobic coating is free from hydrophilic segments other than the amino-functional polymer, for example being free from grafted hydrophilic segments (e.g., polyether or polyalkylene oxide segments).

In a particular refinement of the above method for forming an omniphobic coated article, applying the omniphobic coating to the porous substrate comprises applying an amino-functional polymer (e.g., chitosan) coating to the porous substrate, the amino-functional polymer (chitosan) coating optionally comprising cationic ammonium groups (e.g., $—NH_3^+$ groups, for example as a result of acidification of pendant amino ($—NH_2$) groups of native amino-functional polymer or chitosan with an acid for dissolution in water and coating of the cellulosic or other porous substrate). The amino-functional polymer or chitosan generally forms a smooth outer coating surface, with the amino-functional polymer or chitosan penetrating and filling internal pores of the underlying cellulosic substrate. The method further comprises (optionally) neutralizing the amino-functional polymer (e.g., chitosan) coating, thereby converting at least some of the cationic ammonium groups to (non-ionic) amino groups (e.g., $—NH_2$ groups) and providing a neutralized amino-functional polymer (e.g., chitosan) coating. Neutralization is preferable, but not required, when the amino-functional polymer (e.g., chitosan) coating includes cationic ammonium groups. At least some ammonium groups (but not necessarily all) are preferably converted to corresponding amino groups for subsequent reaction/linking with the functionalized omniphobic polymer. The method further comprises applying the functionalized omniphobic polymer to the (optionally neutralized) amino-functional polymer (e.g., chitosan) coating (e.g., a top surface thereof opposite the interface between the chitosan coating and the substrate). The method further comprises reacting the amino groups of the amino-functional polymer (e.g., chitosan) coating with the functional groups of the functionalized omniphobic polymer to form an omniphobic coating on the porous substrate. This final reaction or (full) curing step incorporates the functionalized omniphobic polymer into the amino-functional polymer or chitosan by reaction with the amino groups from the amino-functional polymer. The omniphobic (polymeric) coating, whether made by this step-wise method, a one-pot method prior to application (as described below), or otherwise can generally be characterized as a graft polymer or a crosslinked (or thermoset) polymer. Chitosan, as an illustrative amino-functional polymer has multiple free amino groups. If the amino-functional polymer is reacted with a mono-functional functionalized omniphobic polymer (e.g., PDMS-mono reactive functionality (such as isocyanate, epoxy)), the resulting omniphobic coating includes grafted functionalized omniphobic polymer segments. If the amino-functional polymer is reacted with a poly-functional functionalized omniphobic polymer (e.g., PDMS-di or multiple reactive functionalizes), the resulting omniphobic coating includes crosslinking functionalized omniphobic polymer segments. In the illustrative examples using HDIT as linker between PDMS and chitosan, the PDMS-NCO generally has one or two free isocyanate groups, which can result in a crosslinked system between neighboring chitosan chains.

In a further refinement of the method for forming an omniphobic coated article, applying the amino-functional polymer (e.g., chitosan) coating to the porous substrate comprises: applying to the porous substrate an amino-functional polymer mixture comprising (i) the amino-functional polymer (e.g., optionally comprising the cationic ammonium groups), and (ii) water; and drying the porous substrate, thereby removing at least some of the water from the amino-functional polymer mixture and forming the amino-functional polymer coating on the porous substrate. The amino-functional polymer mixture, in particular a chitosan mixture, is generally provided as an aqueous mixture or solution, for example in a weak or strong acid solution at a pH value sufficiently low to protonate the pendant amino (—$NH_2$) groups of native chitosan or, thus making the chitosan water-soluble and forming the cationic ammonium groups (—$NH_3$+) groups. A suitable aqueous acidic solution is about 2% (v/v) acetic acid in water, although higher or lower concentrations can be suitably used. The amino-functional polymer can be included in the mixture at a concentration in a range from 0.1 g/100 ml to 5 g/100 ml coating mixture. Any of spraying, casting, rolling, dipping, etc. can be used to apply the amino-functional polymer mixture to the porous substrate. Drying to evaporate/remove water can be performed with or without the application of external heat, for example by simply drying in ambient (room temperature) conditions, such as at about 20-30° C. Elevated drying temperatures can be used if desired to increase drying speed.

In a further refinement of the method for forming an omniphobic coated article, the amino-functional polymer (e.g., chitosan) coating comprises the cationic ammonium groups; and neutralizing the amino-functional polymer coating is performed and comprises contacting the amino-functional polymer coating with a neutralizing agent. The neutralizing agent can be a suitable base (e.g., weak base, strong base, conjugate base), for example in an aqueous solution applied by spraying, casting, rolling, dipping, etc. and followed by drying. Sodium bicarbonate is a suitable neutralizing agent.

In a further refinement of the method for forming an omniphobic coated article, applying the functionalized omniphobic polymer comprises: applying to the amino-functional polymer coating a mixture comprising (i) the functionalized omniphobic polymer, and (ii) a solvent. The solvent can an aprotic organic solvent such as acetone, tetrahydrofuran, 2-butanone, esters (e.g., methyl, ethyl, n-propyl, butyl esters of acetic acid such as n-butyl acetate, etc.), dimethylformamide, dimethyl carbonate, etc. In some embodiments, the mixture can include a catalyst to promote selective bonding between the omniphobic polymer and the amino groups. In other embodiments, the mixture can be free from added catalyst (e.g., with epoxy or isocyanate functional groups that are sufficiently reactive without a catalyst). The mixture can be applied by spraying, casting, rolling, and dipping as well. In a further refinement, the method comprises after applying the functionalized omniphobic polymer to the amino-functional polymer coating, drying the coated substrate to remove the solvent. Drying can be performed at ambient conditions and before heating to accelerate the reaction to form the fully cured omniphobic coating. However, most of the reaction between the amino-functional polymer and the functionalized omniphobic polymer can occur during drying, but some of the reaction may occurs after solvent removal. Drying can also provide some time for the functionalized omniphobic polymer as applied to the external surface of the neutralized chitosan coating to penetrate into interior of the amino-functional polymer coating. Depending on the thickness of the amino-functional polymer coating and the drying time before applying heat for full curing, functionalized omniphobic polymer can be incorporated into either an exterior/top region of the final omniphobic coating, or it can be distributed substantially throughout the omniphobic coating (e.g., for sufficient drying time and/or sufficiently thin amino-functional polymer coatings such that the functionalized omniphobic polymer penetrates essentially completely through the coating to the substrate prior to curing).

In a further refinement of the method for forming an omniphobic coated article, reacting the amino groups of the amino-functional polymer coating with the functional groups (e.g., isocyanate, epoxy, active alkene) of the functionalized omniphobic polymer comprises exposing the coated substrate (i) to a temperature from 0° C. to 180° C. and (ii) for a time from 10 min to 10 days. Curing can be performed at room temperature or by heating (e.g., in an oven, with exposure to a heat lamp, etc.), for example at a temperature from 80° C. or 100° C. to 140° C. or 180° C. and/or for a time from 10 min, 20 min, 30 min, 1 hr, 2 hr, or 4 hr and/or up to 1 hr, 2 hr, 4 hr, 6 hr, 12 hr, or 24 hr. Lower heating temperature or ambient temperature curing also possible, such as room temperature curing (e.g., 20° C. to 30° C.) for 6 hr, 12 hr, 1 day, 2 day, or 5 day to 2 day, or 5 day, 10 day; or lower heating (e.g., 30° C. or 40° C. to 60° C.) for 2 hr, 6 hr, 12 hr, or 1 day to 2 day or 4 day; or 60° C. to 80° C. for 2 hr, 6 hr, or 12 hr to 1 day or 3 day.

In another particular refinement of the above method for forming an omniphobic coated article, applying the omniphobic coating to the porous substrate comprises: reacting the amino groups of the amino-functional polymer (e.g., chitosan) with the functional groups of the functionalized omniphobic polymer in a liquid reaction medium (e.g., in an organic solvent, acid-free water, or combination thereof) to form an omniphobic polymer reaction product (e.g., graft or (partially) crosslinked polymer; which can be in suspension as a result of micelles formation); applying the omniphobic polymer reaction product to the porous substrate (e.g., directly or indirectly from the liquid reaction medium); and drying the porous substrate (e.g., removing solvent(s) from the liquid reaction medium and/or further reacting/curing reaction system components), thereby forming the omniphobic (polymeric) coating to the porous substrate.

In a refinement, the functionalized omniphobic polymer is selected from the group consisting of functionalized polysiloxanes, functionalized polyperfluoroethers, functionalized polybutadienes, functionalized polyisobutenes, functionalized branched polyolefins, functionalized poly(meth) acrylates, functionalized polyesters (e.g., low-Tg polyesters such as low molecular weight poly(lactic acid), poly(hydroxyalkanoates)), functionalized vegetable oils, and combinations thereof.

In a refinement, the functionalized omniphobic polymer comprises a mono-functional functionalized omniphobic polymer (e.g., having only a single functional group reactive with the amino groups of the (neutralized) chitosan coating or other amino-functional polymer, such as at a terminal location (or an internal location) of the omniphobic polymer; such as a mono-functional polysiloxane).

In a refinement, the functionalized omniphobic polymer comprises a di-functional functionalized omniphobic polymer (e.g., having only two functional groups reactive with the amino groups of the (neutralized) chitosan coating or other amino-functional polymer, such as at terminal locations (or internal locations) of the omniphobic polymer; such as a di-functional polysiloxane).

In a refinement, the functionalized omniphobic polymer comprises a poly-functional functionalized omniphobic polymer (e.g., having three, four, or more functional groups reactive with the amino groups of the (neutralized) chitosan coating or other amino-functional polymer, such as at terminal locations of the hydrophobic polymer and/or as pendant groups along the backbone of the omniphobic polymer; such as a poly-functional polysiloxane).

In a refinement, the functionalized omniphobic polymer has a glass transition temperature in a range from −150° C. to 60° C. (e.g., −150° C. to 50° C., 60° C., or 70° C., −130° C. to 40° C., 50° C., or 60° C.).

In a refinement, the functionalized omniphobic polymer is a liquid at a temperature at 70° C. or below. In various embodiments, the functionalized omniphobic polymer is liquid below 70° C., 50° C., or 30° C., for example liquid at a temperature in a range from 10° C. to 40° C., 20° C. to 30° C., −40° C. to 30° C., −40° C. to 70° C., 30° C. to 70° C., or about room temperature. For example, the functionalized omniphobic polymer can have a melting temperature ($T_m$) below 10° C. or 20° C.

In a refinement, the functionalized omniphobic polymer has a molecular weight ranging from 300 to 50,000 g/mol or 300 to 300,000 g/mol. The functionalized omniphobic polymer can have any suitable molecular weight in view of desired glass transition temperature, for example having a molecular weight ranging from 300 to 50,000 g/mol or 300 to 300,000 g/mol. In various embodiments, the molecular weight can be at least 300, 800, 1000, 1500, or 2000 and/or up to 1000, 2000, 3000, 5000, 50,000, 150,000, or 300,000 g/mol. The molecular weight can be expressed as a number-average or weight-average value in the units of gram/mole (g/mol). Some embodiments can include a blend of two or more functionalized omniphobic polymers with different average molecular weights, such as one with 300-1500 g/mol and another with 1500-50,000 g/mol with a higher average molecular weight than the first. Blends of functionalized omniphobic polymers (e.g., differing in molecular weight and/or in degree of functionality) can improve the combination of water- and oil-repellency properties of the final composition. For example, a mono-functionalized polysiloxane can provide better water and oil repellency than a di-functionalized polysiloxane. Low MW functionalized polysiloxanes (e.g., PDMS, such as having a MW range of about 800-1200 g/mol or an average MW of about 1000 g/mol) can provide an improved water repellency, while Higher MW functionalized polysiloxanes (e.g., PDMS, such as about 2000 g/mol or above for an average or range of MVV) can provide an improved oil repellency.

In a refinement, the functional group of the functionalized omniphobic polymer is selected from the group consisting of isocyanate groups, epoxy groups, vinyl groups, aldehyde groups, anhydride groups, esters, active esters (e.g., N-hydroxysuccinimide, hydroxybenzotriazole) and combinations thereof (e.g., as a functionalized omniphobic polymer having multiple different types of functional groups).

The isocyanate groups are generally reactive with the amino group of the amino-functional polymer to form urea linkages between the amino-functional polymer and the functionalized omniphobic polymer. An isocyanate-functional functionalized omniphobic polymer can be provided, for example, as a reaction product between a polyisocyanate (described below) and an amine-functionalized omniphobic polymer such as an amino-functional polysiloxane.

The epoxy groups are generally reactive with the amino group of the amino-functional polymer to form beta-hydroxy amine linkages between the amino-functional polymer and the functionalized omniphobic polymer. A "beta-hydroxy amine" includes a structure in which a hydroxyl group is attached to a beta-carbon, the beta-carbon is attached to an alpha-carbon, and the alpha carbon in the one directly attached to the nitrogen atom of the reacted amine. The beta-hydroxy amine can be represented by a —CH(OH)—CH$_2$—NR$_1$R$_2$ group, where R$_1$ and R$_2$ can be another beta-hydroxy group or the remainder of the amino-functional polymer or the functionalized omniphobic polymer. An epoxy-functional functionalized omniphobic polymer can be provided, for example, as a reaction product between a polyepoxide (such as bisphenol A diglycidyl ether) and an amine-functionalized omniphobic polymer such as an amino-functional polysiloxane. The polyepoxide can be selected from the group consisting of polyepoxide-substituted aromatic hydrocarbons, aliphatic hydrocarbons, cycloaliphatic hydrocarbons, ethers thereof, esters thereof, imines thereof, and combinations thereof. The polyepoxide can include hydrocarbons with two or more epoxide groups and one or more aromatic, aliphatic, cycloaliphatic, ether, ester, and/or imine groups in the hydrocarbon to which the epoxide groups are attached. Suitable polyepoxides can be derived from petroleum and plant materials. Suitable polyepoxides include two or more glycidyl ether groups (i.e., epoxide-containing groups). Some examples of polyepoxides include, but are not limited to, bisphenol A epoxy (e.g., diglycidyl ether of bisphenol A having 1 or 2-25 bisphenol A repeat units), bisphenol F epoxy (e.g., diglycidyl ether of bisphenol F having 1 or 2-25 bisphenol F repeat units), epoxy phenol novolac, epoxy cresol novolac, cycloaliphatic epoxies, halogenated epoxies, epoxy-vinyl esters, tetraglycidylmethylenedianiline (TGMDA), 3,4-epoxycyclohexylmethyl 3,4-epoxycyclohexanecarboxylate (ECC), bis[3,4-epoxycyclohexylmethyl] adipate (BECHMA), poly (glycidyl methacrylate), epoxies of rosin acid, epoxies of diphenolic acid, epoxies of tannin acid, epoxies derived from glucose, isosorbide epoxies, eugenol epoxies, furan epoxies, cathechin epoxies, vanillin-based epoxies, quercetin epoxies, epoxies derived from gallic acid, epoxies from phenols, epoxies from cardanols, epoxies from plant oils, terpene oxides (e.g., limonene dioxide), and combinations thereof.

The vinyl groups (e.g., (meth)acrylic/acrylate groups) are generally reactive with the amino group of the amino-functional polymer via a hydroamination reaction to form —C—N— linkages between the amino-functional polymer and the functionalized omniphobic polymer. A vinyl-functional functionalized omniphobic polymer can be provided, for example, as a reaction product between a (meth)acrylic acid and an amine-functionalized omniphobic polymer such as an amino-functional polysiloxane. An aldehyde-functional functionalized omniphobic polymer can be provided, for example as an aldehyde-functional polysiloxane for reaction with chitosan or other amino-functional polymer.

In a refinement, the functionalized omniphobic polymer comprises an isocyanate-functionalized polysiloxane (e.g., an isocyanate group for the functional group of the functionalized omniphobic polymer). In a further refinement, the isocyanate-functionalized polysiloxane comprises a reaction product of an amine-functionalized polysiloxane and a polyisocyanate. The amine-functionalized polysiloxane can be a mono-, di-, or poly-amine functionalized polysiloxane as generally described above. The polyisocyanate can be di-, tri-, or higher functional such as a diisocyanate, triisocyanate, blend of multiple polyisocyanates with same or different functionality. Reaction between a general amine-functionalized omniphobic polymer and a polyisocyanate can be used to form the isocyanate-functionalized omniphobic polymer. The polyisocyanate can be selected from the group consisting of 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, diand tetraalkyl-diphenylmethane diisocyanate, 4,4'-dibenzyl diisocyanate, 1,3-phenylene diisocyanate, 1,4-phenylene diisocyanate, one or more isomers of tolylene diisocyanate (TDI), 1-methyl-2,4-diiso-cyanatocyclohexane, 1,6-diisocyanato-2,2,4-trimethyl-hexane, 1,6-diisocyanato-2,4,4-trimethylhexane, 1-iso-cyanatomethyl-3-isocyanato-1,5,5-trimethylcyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (HDI), HDI dimer (HDID), HDI trimer (HDIT), HDI biuret, 1,5-pentamethylene diisocyanate (PDI), PDID (dimer of PDI), PDIT (trimer of PDI), PDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, and combinations thereof.

In a refinement, the omniphobic coating has an amino-functional polymer (e.g., chitosan) content in a range from about 0.1 wt. % to 20 wt. % relative to the porous substrate (e.g., at least 0.1, 1, 2, 3, 4, or 6 wt. % and/or up to 5, 8, 10, 12, 15, or 20 wt. %).

In a refinement, the omniphobic coating has a functionalized omniphobic polymer content in a range from about 0.1 wt. % to 5 wt. % or 0.1 wt. % to 10 wt. % relative to the porous substrate (e.g., at least 0.1, 0.2, 0.5, 1, 1.5, or 2 wt. % and/or up to 1, 2, 3, 4, 5, 6, 8, or 10 wt. %).

In a refinement, the omniphobic coating has a molar ratio of amino-functional polymer amino groups (e.g., chitosan amino groups and ammonium groups combined) relative to (graft or crosslinking) linkages (e.g., urea groups for isocyanate reactions with amino groups) with the functionalized omniphobic polymer in a range from 1 to 30 or 1 to 90. More generally, the molar ratio can be at least 1, 4, 6, 8, 10, 12, or 15 and/or up to 12, 15, 20, 25, 30, 45, 60, 75, or 90 for moles/number amino and/or ammonium groups:moles/number linking (e.g., urea) groups. Similar ranges can apply for moles/number amino groups:moles/number linking groups (e.g., when most or essentially all of the ammonium groups were converted to amino groups before reaction with the amino groups). Generally only a fraction of the amino groups in the amino-functional polymer (chitosan or otherwise) are reacted to covalently attach the functionalized omniphobic polymer (e.g., via urea or other linkages).

In a refinement, the omniphobic coating has a water contact angle in a range from 90° to 120°. In a refinement, the omniphobic coating has an oil contact angle in a range from 1° to 65°. In a refinement, the omniphobic coating has a water sliding angle in a range from 1° to 30° or 1° to 80° for a 75 µl droplet. In a refinement, the omniphobic coating has a water sliding angle in a range from 1° to 20° for a 25 µl droplet. In a refinement, the omniphobic coating is resistant to the spreading of oil on its surface. More generally, the omniphobic properties of the omniphobic coated article or corresponding coating can be characterized in terms of one or more contact angles and/or sliding angles for water and/or oil droplets (e.g., vegetable oil and/or hexadecane) on the thermoset coating (e.g., as a coating on a substrate). The following ranges are representative of articles and coatings according to the disclosure which display favorable omniphobic properties. In an embodiment, the article or coating has a water contact angle in a range from 90° to 120° (e.g., at least 90°, 95°, 100°, or 105° and/or up to 110°, 115°, or 120°; such as for the cured composition as a coating). In some cases, the water contact angle can be up to about 125° for non-smooth or rough surfaces. In an embodiment, the article or coating has an oil contact angle in a range from 0° or 1° to 65° (e.g., at least 1°, 10°, 20°, or 30° and/or up to 40°, 50°, 60°, or 65°; such as for the cured or final composition as a coating). In an embodiment, the article or coating has a water sliding angle in a range from 0° or 1° to 30° or 1° to 80° for a 75 µl droplet (e.g., at least 1°, 2°, 4°, 6°, or 8° and/or up to 10°, 15°, 20°, 30°, 40°, 60°, or 80°; such as for the cured or final composition as a coating). In an embodiment, the article or coating has an oil sliding angle in a range from 0° or 1° to 20° for a 25 µl droplet (e.g., at least 1°, 2°, 4°, 6°, or 8° and/or up to 10°, 12°, 15°, or 20°; such as for the cured or final composition as a coating). The contact angles for the omniphobic article or coating can be higher when nanofillers (e.g., clay, silica, etc.) are included in the composition as compared to a corresponding composition without any nanofillers. For example, in the case of articles or coatings further including one or more nanofillers (e.g., nanoclay, graphene oxide, graphene, silicon dioxide (silica), aluminum oxide, cellulose nanocrystals, carbon nanotubes, titanium dioxide), the contact angles suitably can range from 100° to 150° for water, and from 20° to 120° for oil. Similarly, the sliding angles for water on the surface of nanofiller-containing articles or coatings can range from 0° or 1° to 20° for a 25 µl droplet.

In a refinement, the omniphobic coating has a thickness ranging from 0.01 µm to 500 µm or 0.01 µm to 1000 µm. More generally, the omniphobic coating can have any desired thickness on the substrate. In common applications, the coating has a thickness ranging from 0.010 µm to 500 µm or 0.01 µm to 1000 µm, for example at least 0.01, 10, 20, 50, or 100 µm and/or up to 200, 500, or 1000 µm. Typical cast coatings can have thicknesses of 10 µm to 100 µm. Typical spin coatings can have thicknesses of 0.05 µm or 0.10 µm to 0.20 µm or 0.50 µm. Multiple coating layers can be applied to substrate to form even thicker layers of the coating (e.g., above 500 µm, 1000 µm, or otherwise) if desired.

In a refinement, the omniphobic coated article has a relative permeability for water vapor of 0.7 or less (e.g., at least 0.01, 0.1, 0.2, or 0.3 and/or up to 0.3, 0.4, 0.5, 0.6, or 0.7 relative permeability), relative to a corresponding porous substrate without the omniphobic coating thereon (e.g., based on absolute water vapor transmission rates for the coated article and uncoated porous substrate).

In a refinement, the omniphobic coated article has a relative uptake (or gain) for liquid water of 0.7 or less (e.g., at least 0.01, 0.1, 0.2, or 0.3 and/or up to 0.3, 0.4, 0.5, 0.6, or 0.7 relative uptake), relative to a corresponding porous substrate without the omniphobic coating thereon (e.g., based on absolute liquid water uptake or gain rates (such as in mass/area) for the coated article and uncoated porous substrate).

In a refinement, the omniphobic coated article has a kit rating of 7 to 12 (e.g., 7, 8, 9, 10, 11, or 12), as determined by TAPPI Standard Method T 599 pm-96.

In another aspect, the disclosure relates to a method for recycling an omniphobic coated article, the method comprising: providing an omniphobic coated article according to any of its variously disclosed embodiments; and extracting the omniphobic coated article in an aqueous extraction medium having a pH value sufficient to separate the omniphobic polymeric coating from the porous substrate and to form micelles from the omniphobic polymeric coating dispersed in the aqueous extraction medium. The omniphobic coated article suitably is one in which the omniphobic polymeric coating is capable of forming an aqueous dispersion of micelles formed from the omniphobic polymeric coating upon aqueous extraction of the omniphobic coated article under suitable pH conditions, for example a coating which has been applied from an aqueous dispersion comprising omniphobic polymeric micelles therein. Extraction suitably removes substantially all of the omniphobic polymeric coating from the porous substrate, for example at least 95, 98, or 99 wt. % and/or up to 90, 95, 98, 99, or 100 wt. % of the omniphobic polymeric coating initially present on the omniphobic coated article. Two factors affect the extraction, in particular for a cellulosic/paper substrate. First, the coating should be exposed to water during a pulping process. During pulping, the initial coating that has an omniphobic coating on the surface (e.g., PDMS) and that was protecting the underlying amino-functional polymer (e.g., chitosan) and paper from water is no longer an effective barrier. Water can reach paper pulp through sides and where the omniphobic coating is not present. This allows the amino-functional polymer to detach from the pulp. Low or high pH values facilitate the amino-functional polymer solubility in water.

In a refinement, the recycling method further comprises separating the porous substrate from the aqueous extraction medium; and recovering and/or reforming the porous substrate. Separating the porous substrate from the aqueous extraction medium can be performed by any suitable solid/liquid separation process, for example filtration or decantation to retain the porous substrate (fiber/pulp etc.) and remove the aqueous extraction medium with the omniphobic polymeric micelles therein, optionally followed by one or more washing steps to remove any residual omniphobic polymeric coating material remaining in/on the porous substrate. The micelles additionally can be separated from the water by using dialysis, and/or water evaporation. Neutralization may convert the chitosan or other amino-functional polymer to a water-insoluble form to precipitate the micelles. If the omniphobic coated article is pulped, ground, or otherwise size-reduced prior to extraction, the resulting porous substrate fragments can be recovered after separation from the aqueous extraction medium and then re-formed into a new, recycled porous substrate, for example recycled paper or other cellulosic substrate. The recovered or reformed porous substrate is substantially free from the omniphobic polymeric coating, for example having 5 wt. % or less coating material remaining relative to the initial coating material prior to extraction (e.g., at least 0.01 m 0.1, 0.5, 1, or 2 wt. % and/or up to 1, 2, or 5 wt. %). Alternatively or additionally, the recovered or reformed porous substrate can have 0.1 wt. % or less coating material relative to the porous substrate (e.g., at least 0.0001, 0.001, or 0.01 wt. % and/or up to 0.001, 0.01, or 0.1 wt. %). Recycled pulp (without washing) can be used to make recycled paper, and the end paper can be recoated with a fresh or recycled omniphobic coating to make the recycled substrate again omniphobic.

In a refinement, the aqueous extraction medium for the recycling method has a pH value of up to 6 or greater than 8. Extraction can be performed in an acidic medium, for example having a pH value of at least 1, 2, 3, or 4 and/or up to 3, 4, 5, or 6, such as about 4-5 or 4-6. Extraction can be performed in a basic medium, for example having a pH value of at least 8, 9, 10, 11, or 12 and/or up to 11, 12, 13, or 14, such as about 8-12, 8-11, or 10-12. The pH value of the extraction medium can represent the initial pH value of the medium, which could change during extraction as various species are extracted from the coated article. The extraction medium generally includes water and one or more acid, base, and/or buffer components to maintain the desired pH value. In some embodiments, the extraction medium can include a light volatile alcohol (e.g., ethanol or methanol) as an alternative or supplement to water, because the alcohols can be easily be evaporated from the micelles to recover the micelles for another coating use or to simply isolate the micelles for disposal.

In a refinement, the recycling method further comprises performing a size reduction process on the omniphobic coated article prior to extracting the omniphobic coated article in the aqueous extraction medium. Size reduction can included pulping, grinding, or any other type of destructive mechanical process to fragment the coated article into smaller fragments, in particular to increase surface area exposure at interfacial regions between the porous substrate and the omniphobic coating, thereby enhancing contact between the aqueous extraction medium and hydrophilic portions of the omniphobic coating, which in turn promotes micelle formation in the extraction medium and removal of the coating from the substrate. Smaller fragment sizes generally promote extraction efficiency.

While the disclosed articles, methods, and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein.

DETAILED DESCRIPTION

Figure 1:
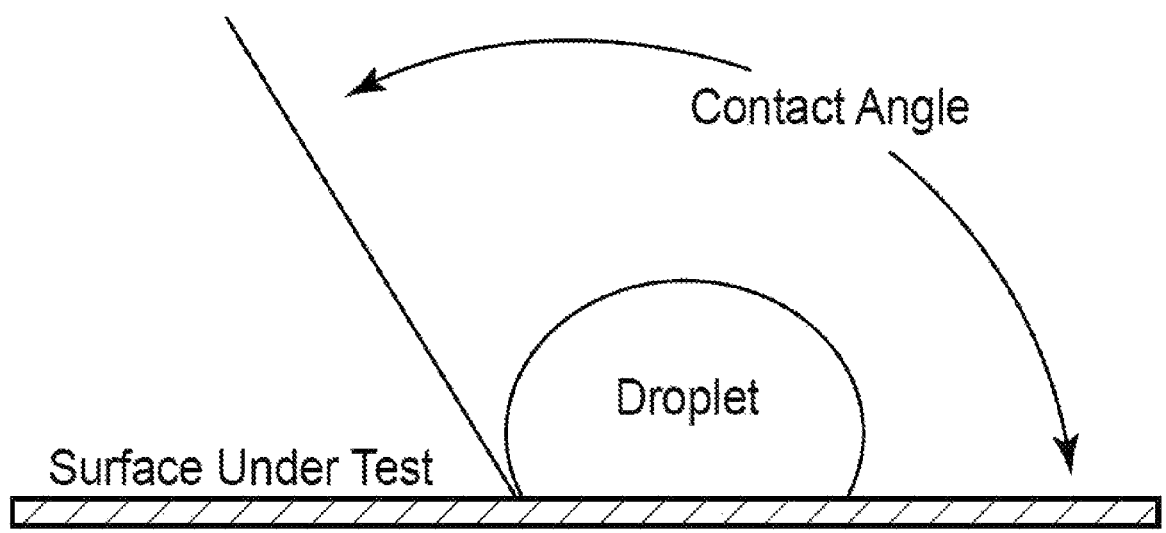
FIG. 1 is a diagram illustrating measurement of a contact angle for a liquid droplet on a surface.
Figure 2:
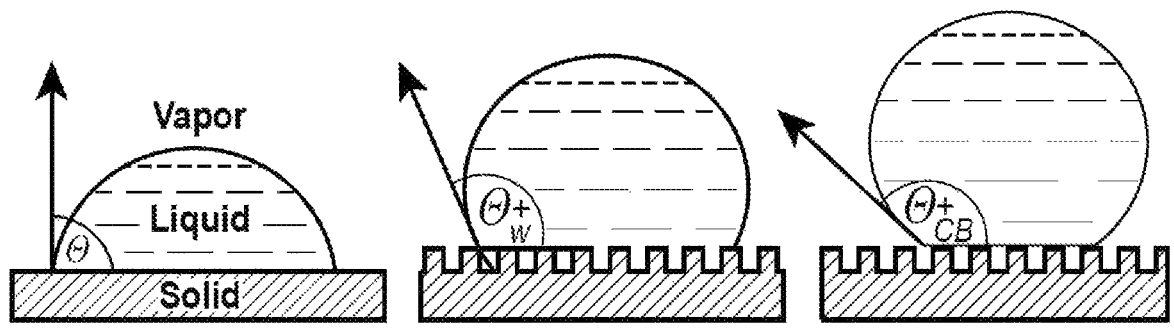
FIG. 2 is a diagram illustrating how contact angles for a given liquid droplet on a surface can vary as a function of surface topology (e.g., flat or smooth surface vs. textured surfaces).

The disclosure relates to omniphobic coatings, related articles including such coatings, and related method for forming such coatings or articles, for example biobased and/or biodegradable omniphobic coatings. The omniphobic coating includes a reaction product between an amino-functional polymer (such as chitosan) and an amino-reactive functionalized omniphobic polymer (such as PDMS functionalized with isocyanate, epoxy, or vinyl groups) having a glass transition temperature ($T_g$) of 60° C. or less. The omniphobic coating has a weight ratio of amino-functional polymer relative to functionalized omniphobic polymer of at least 1 or 2. A corresponding omniphobic coated article can include the omniphobic coating on a porous substrate such as a cellulosic or paper substrate, for example to provide a water- and oil/fat/grease-resistant coating for a paper-based product. The omniphobic coating can be formed in a reaction medium before being applied to the substrate, or the omniphobic coating can be formed on the substrate with serial application of the amino-reactive functionalized omniphobic polymer and the amino-functional polymer thereon.

In an illustrative embodiment and as described in more detail below in the examples, the disclosure relates to a fluorine-free, water- and oil/fat/grease-resistant papers that can be used for packaging and food-service applications (e.g., disposable plates and cups, wrappers for greasy food) using environmentally friendly, biobased and fully biodegradable materials. In the illustrative embodiment, a chitosan coating was applied to a paper substrate to render the paper oil/grease-resistant, and polydimethylsiloxane (PDMS) was applied to impart water-resistant properties as well as to further increase the grease resistance of the chitosan-coated paper. Surface Response Methodology (SRM) was applied to optimize the concentrations of chitosan and PDMS to obtain the desired water- and oil/grease-resistant properties. Paper coated with a load of 8.6% of chitosan and 2.2% of PDMS showed excellent grease/oil kit rating value 12/12 (maximum fat resistance) and good water resistance (water contact angles of 95.2°). In addition, the chitosan coated paper was extracted to confirm the non-leaching of the PDMS from the paper. Because of the simplicity of this approach, the fluorine-free, oil/grease- and water-resistant papers are suitable for applications in food packaging such as disposable plates and cups. The coated articles are fully biodegradable and fluorine-free, thus reducing the need for landfill disposal.

In an illustrative embodiment and as described in more detail below in the examples, the disclosure relates to a reversibly attached water- and oil-coating for paper or other porous or cellulosic substrates, which avoids chemical modifications of the substrate and the corresponding reduction in recyclability resulting therefrom. In the illustrative embodiment, aqueous micellar chitosan-graft-poly(dimethyl siloxane) (chitosan-g-PDMS) is used for paper coating. Upon drying, the chitosan part of chitosan-g-PDMS strongly adheres to the paper or cellulosic substrate via strong hydrogen bonding between the polar hydroxyl groups of the cellulosic substrate and the hydroxyl and/or (unreacted) amino groups of the chitosan. In contrast, the PDMS portion of the chitosan-g-PDMS migrates or orients itself to the surface because of the favorable interaction between air and PDMS. The presence of PDMS on the surface, thus masking the polar hydroxyl and amino groups of cellulose and chitosan and making paper water-resistant. Because chitosan fills the pores on the paper or other porous substrate, the coated substrate is also oil-resistant. In this illustrative embodiment, the chitosan-g-PDMS is a model graft copolymer, which can be extended to other polymer systems including reaction products between an amino-functional polymer and a functionalized omniphobic polymer.

This embodiment illustrates a closed loop circular economy approach for water and oil/grease resistant paper or other cellulosic substrates. Consequently, it substantially reduces the massive pulp losses occurring due to the conventional paper fabrication approaches. Furthermore, this approach also reduces the use of non-degradable plastic and latex in the paper industry. This approach also benefits the environment by reducing pulp waste, which in turn reduces MSW, decreases deforestation, and saves water and energy used for making virgin pulp from trees. By varying the nature of (bio)degradable polymers used as coating polymers, the water- and grease-resistance can be tuned, and paper with desirable properties can be fabricated.

As described above for this illustrative embodiment, chitosan is used to fill/mask the pores of the paper or other porous substrate, while the exposed coated surface will have low surface energy due to the presence of PDMS to prepare water- and oil-repellent coatings. The substrate coating can be applied from an aqueous micelle solution of chitosan-g-PDMS, where chitosan forms a water-soluble corona and PDMS forms a water-insoluble core. The aqueous micelle solution is applied to the substrate and, once the water evaporates, the PDMS will enrich on the surface of the coated substrate due to the favorable interaction between air and paper. Once the coating is dried, chitosan forms strong hydrogen bond with cellulose due to the presence of polar hydroxyl and amine groups in chitosan. This strong hydrogen bonding enables good adhesion of the chitosan to the paper or cellulosic substrate, which promotes coating stability. Because of the masking/filling of the pores on the substrate by chitosan and the presence of PDMS on the surface, the resulting coated substrate is water- and oil-repellent.

Chitosan is water soluble at low pH (~4.5). One advantage of using PDMS is its oily nature and hence it does not precipitate from aqueous medium. Therefore, in an embodiment, isocyanate-functional PDMS (PDMS-NCO) can be reacted with chitosan in aqueous medium to synthesize chitosan-g-PDMS. The resultant chitosan-g-PDMS can form unimolecular micelles in water at pH ~4.5 because of good solubility of the chitosan in this medium, while PDMS is insoluble and the chains collapse to reduce interfacial tension with water molecules.

Chitosan is an example of a suitable amino-functional polymer because it is water soluble (at low pH) and has amine groups that can be utilized to react with the NCO of the PDMS-NCO to form a chitosan-g-PDMS graft copolymer. Chitosan and hemicellulose (paper) has structural similarity as both are biobased and both are having many polar hydroxyl groups, thus chitosan can form strong hydrogen bonds with paper (hemicellulose). Also, chitosan has the ability to fill/mask pores on the paper, which is important for making paper oil-resistant. Chitosan is also biobased, edible, non-toxic, low-cost and a fully-biodegradable polymer.

Polydimethyl siloxane (PDMS) is an example of a suitable functionalized omniphobic polymer because it offers good water and oil resistance due to its low surface energy. PDMS is commercially available with functional groups such as amino groups, which readily reacts with a polyisocyanate to form PDMS-NCO. This PDMS-NCO is an oily-like polymer and can easily be dispersed in water to be grafted onto chitosan. PDMS also degrades into non-toxic silicate minerals, and is considered safe for food processing.

Pentamethylene diisocyanate trimer (PDIT) is an example of a suitable polyisocyanate for PDMS functionalization. PDMS is commercially available at affordable cost in the form of an amino-functional PDMS (PDMS-NH2). To enable PDMS grafting onto chitosan, PDIT is reacted with PDMS-NH2 to obtain PDMS-NCO. The PDIT is selected because once PDMS-NH2 reacts with NCO, there are still one or two free NCO attached to PDMS. The free NCO group(s) of PDMS-NCO can readily and selectively react with the amino groups of chitosan in an aqueous medium, which is important because of the chitosan solubility in water. PDIT is also selected because it is biobased.

Papers fabricated with latex, wax and plastic films are difficult to recycle because, during the recycling process, pulp and plastic (or wax pieces) stick to each other. If this pulp carrying wax or plastic pieces is used for papermaking, the paper will be mechanically weak and will have uneven distributed plastic pieces. Therefore, laminated-, waxed- and latex-coated papers are typically not recycled, which is causing enormous loss to precious pulp as well as causing environmental problems by creating MSW. The disclosed chitosan-g-PDMS and related omniphobic polymeric coatings address this problem by providing a paper coating that permits efficient pulp recycling. The pulp of chitosan-g-PDMS-coated paper can be recycled by the separation of chitosan-g-PDMS from pulp using water at different pH. When the coated paper is re-pulped (or otherwise ground, etc.), the chitosan initially masked by water-repellent PDMS chains is exposed to surrounding water particularly at the edges, which facilitates the dissolution of chitosan-g-PDMS in an aqueous medium. A higher or lower pH can speed up this process because chitosan solubility is high at low as well as high pH values. In addition, chitosan-g-PDMS-coated paper, if re-pulped without washing out of the chitosan-g-PDMS, can be used to form recycled paper made from this recycled pulp, for example while still possessing good mechanical properties.

Omniphobic Composition and Coated Article

In one aspect, the disclosure relates to omniphobic (polymeric) composition, for example for use as a coating on a porous substrate or sealant between porous substrates. The omniphobic (polymeric) composition or coating is generally a reaction product between an amino-functional polymer and a functionalized omniphobic polymer. The amino-functional polymer generally has a plurality of amino groups, for example as pendant or backbone groups on/in polymeric repeat units, for example including chitosan as described below. The functionalized omniphobic polymer generally has a glass transition temperature ($T_g$) of 60° C. (or 50° C.) or less, for example including components such as PDMS and other polymers and plant oils as described below. The functionalized omniphobic polymer include one or more functional groups reactive with the amino groups of the amino-functional polymer, such as isocyanate, epoxy, vinyl, aldehyde, and/or anhydride groups. In some embodiments, the omniphobic composition or coating has a weight ratio of amino-functional polymer relative to functionalized omniphobic polymer of at least 0.5, 1, or 2, such as in a range from 2 to 20. More generally, the ratio can be at least 0.5, 1, 2, 3, 4, 5, or 8 and/or up to 3, 4, 5, 7, 10, 12, 15, or 20 for the weight amino-functional polymer:weight functionalized omniphobic polymer in the omniphobic coating. In some embodiments, the omniphobic coating is capable of forming an aqueous dispersion of micelles formed from the omniphobic coating upon aqueous extraction of a corresponding omniphobic coated article under suitable pH conditions.

Figure 3:
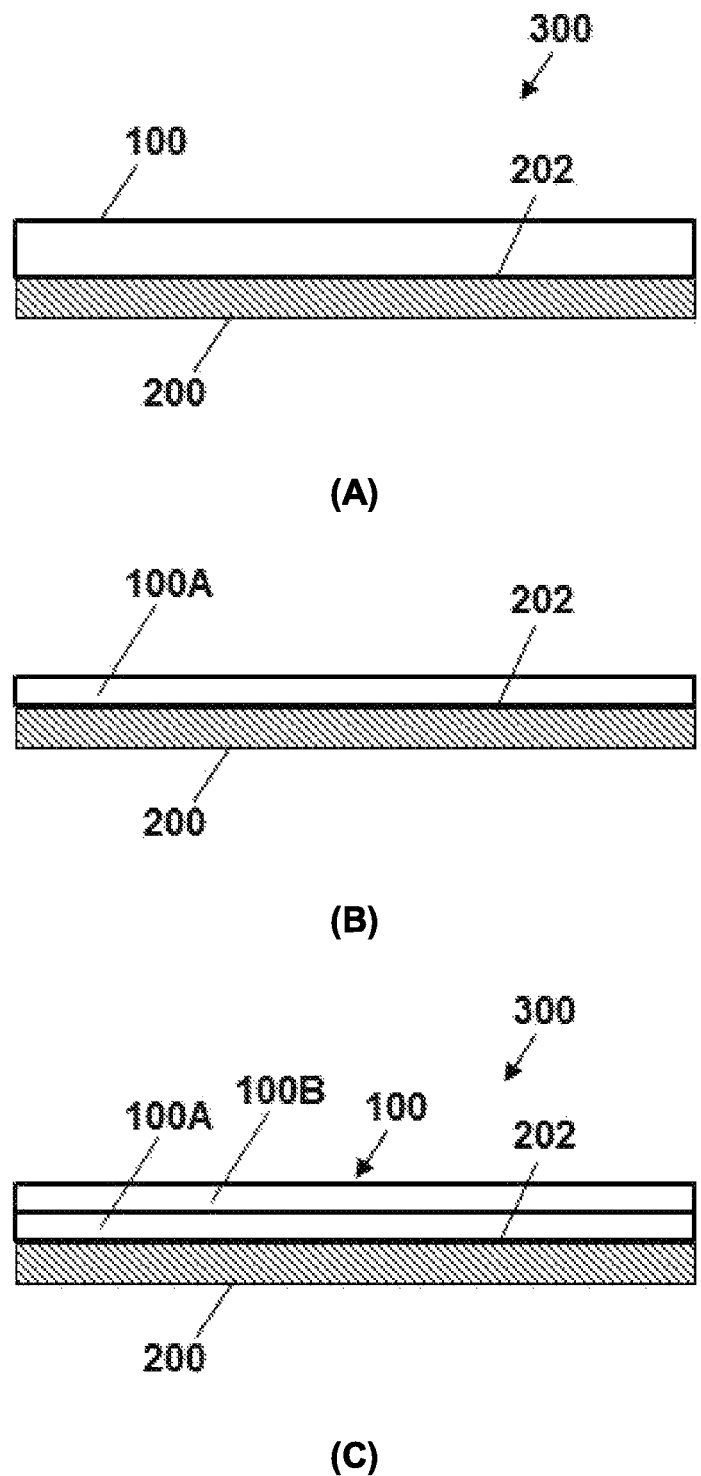
FIG. 3 illustrates an omniphobic coated article according to the disclosure.

FIG. 3 illustrate an aspect of the disclosure in which a coated article 300 (e.g., desirably having omniphobic properties on at least one surface thereof) includes a porous substrate 200 and the omniphobic composition 100 coated on a surface 202 of the substrate 200. The composition 100 can be in the form of a coating or film on an external, environment-facing surface 202 of the substrate 200 (e.g., where the surface 202 would otherwise be exposed to the external environment in the absence of the composition 100). In this case, the omniphobic composition 100 provides omniphobic protection to the underlying substrate 200. Panel A of FIG. 3 illustrates the omniphobic composition 100 as single layer, for example an essentially homogeneous layer resulting from application of an aqueous dispersion of omniphobic polymeric micelles including the (already formed) reaction product between the amino-functional polymer and the functionalized omniphobic polymer. Panels B and C of FIG. 3 illustrate the omniphobic composition 100 as composite of two layers 100A and 100B. The first layer 100A can be an amino-functional polymer coating originally applied to the porous substrate prior to reaction with the functionalized omniphobic polymer. The second layer 100B can be an functionalized omniphobic polymer coating applied to the first layer 100A (e.g., in a solvent solution), whereupon the amino-functional polymer and the functionalized omniphobic polymer can blend and react at the interface between 100A/100B to form the reaction product between the amino-functional polymer and the functionalized omniphobic polymer.

The porous substrate 200 is not particularly limited, and generally can be formed from any material desired for protection with an omniphobic coating, in particular given the good, broad adhesive capabilities of the omniphobic composition 100 on the underlying porous surface. For example, the porous substrate 200 can be a porous cellulosic substrate. The method and coated articles generally can use any porous substrate, cellulosic or non-cellulosic, for example porous metal substrates, porous plastic substrates such as polymeric foams, and porous cellulosic substrates. A cellulosic substrate generally includes at least one of cellulose and hemicellulose, and it can further include lignin (e.g., as a lignocellulosic substrate). Example cellulosic or other porous substrates include paper (e.g., bleached, unbleached, coated and uncoated), corrugated board, cardboard, wood, and fabric or textiles. Examples of paper substrates can include generally thinner, flexible papers, for example useful as wrapping materials, as well as generally thicker, rigid papers or cardboard (e.g., corrugated paper cardboard), for example useful as box, container, plate, cup, or other storage or food-service items. Suitable wood materials can be any type of wood commonly used in home, office, and outdoor settings. Suitable fabric or textile materials can include any cellulosic materials commonly used in garments or otherwise, such as cotton, jute, flax, hemp, etc. In some embodiments, the cellulosic substrate is in the form of a food-service article such as a drinking cup, a food plate, of a food wrapper. In some embodiments, the cellulosic substrate is in the form of a packaging box, such as corrugated boxes, cardboard boxes, etc.

The omniphobic composition 100 can have any desired thickness on the porous substrate 200. In common applications, the composition 100 has a thickness ranging from 0.010 μm to 500 μm or 0.01 μm to 1000 μm, for example at least 0.01, 10, 20, 50, or 100 μm and/or up to 200, 500, or 1000 μm. Typical cast coatings can have thicknesses of 10 μm to 100 μm. Typical spin coatings can have thicknesses of 0.05 μm or 0.10 μm to 0.20 μm or 0.50 μm. Multiple coating layers can be applied to substrate 200 to form even thicker layers of the composition 100 (e.g., above 500 μm or otherwise) if desired.

The amino-functional polymer is not particularly limited, and generally can include any synthetic or naturally based polymeric material including a plurality of amino groups, for example as amine and/or ammonium groups (e.g., as —$NH_2$ or —$NH_3^+$ groups, respectively), for example as pendant or backbone groups on/in polymeric repeat units. In an embodiment, the amino-functional polymer is chitosan. The amino-functional polymer or chitosan in particular can be in a form having substantially no ammonium groups, such as when the amino-functional polymer is neutralized or otherwise not in cationic form. In other cases, the amino-functional polymer or chitosan in particular can include ammonium groups, and substantially no amine groups. In other cases, the amino-functional polymer or chitosan in particular can include at least some amine groups and at least some ammonium groups (e.g., when partially neutralized/acidified and in partially cationic form). The amino-functional polymer or chitosan in particular can have a molecular weight in a range from 1000 to 500,000 g/mol. The degree of deacetylation of the amine in the chitosan suitably is in the range of 5% to 100%, such as between 85% and 100%. The amino-functional polymer or chitosan can be used as mixture, for example in different weight percent ranges such as between 5% and 99% amino-functional polymer or chitosan, with other hydrophilic polymers, such as polyvinyl alcohol (PVOH), sodium alginate, starch, water-soluble proteins, and/or polyethylene imine (PEI, such as linear or branched PEI). The hydrophilic polymers may carry amino groups (e.g., $NH_2$ or NH groups such as in PEI) or hydroxy groups (e.g., OH groups such as in polyvinyl alcohol and starch), and/or carboxylic groups (e.g., ionic COOH groups such as in sodium alginate). The amino-functional polymer can include PEI, for example alone or in combination with another amino-functional polymers such as chitosan, which optionally can be blended with non-amino hydrophilic polymers such as PVOH, starch, and sodium alginate. In some embodiments, the omniphobic coating is free from non-amino hydrophilic polymers. In some embodiments, the omniphobic coating is free from hydrophilic segments other than the amino-functional polymer, for example being free from grafted hydrophilic segments (e.g., polyether or polyalkylene oxide segments).

The functionalized omniphobic polymer is not particularly limited and generally can include any omniphobic polymer with glass transition temperature of 60° C. or 50° C. or less, such as in a range from −150° C. to 60° C. or 50° C. The functionalized omniphobic polymer can be a liquid at a temperature at 70° C. or below. In various embodiments, the functionalized omniphobic polymer is liquid below 70° C., 50° C., or 30° C., for example liquid at a temperature in a range from 10° C. to 40° C., 20° C. to 30° C., −40° C. to 30° C., −40° C. to 70° C., 30° C. to 70° C., or about room temperature. For example, the functionalized omniphobic polymer can have a melting temperature ($T_m$) below 10° C. or 20° C.

The functional group of the functionalized omniphobic polymer can include one or more isocyanate groups, epoxy groups, vinyl groups, aldehyde groups, and/or anhydride groups, for example as a functionalized omniphobic polymer having multiple different types of functional groups. Isocyanate groups are generally reactive with the amino group of the amino-functional polymer to form urea linkages between the amino-functional polymer and the functionalized omniphobic polymer. An isocyanate-functional functionalized omniphobic polymer can be provided, for example, as a reaction product between a polyisocyanate and an amine-functionalized omniphobic polymer such as an amino-functional polysiloxane. Epoxy groups are generally reactive with the amino group of the amino-functional polymer to form beta-hydroxy amine linkages between the amino-functional polymer and the functionalized omniphobic polymer. A "beta-hydroxy amine" includes a structure in which a hydroxyl group is attached to a beta-carbon, the beta-carbon is attached to an alpha-carbon, and the alpha carbon in the one directly attached to the nitrogen atom of the reacted amine. The beta-hydroxy amine can be represented by a —CH(OH)—$CH_2$—$NR_1R_2$ group, where $R_1$ and $R_2$ can be another beta-hydroxy group or the remainder of the amino-functional polymer or the functionalized omniphobic polymer. An epoxy-functional functionalized omniphobic polymer can be provided, for example, as a reaction product between a polyepoxide (such as bisphenol A diglycidyl ether) and an amine-functionalized omniphobic polymer such as an amino-functional polysiloxane. The polyepoxide can be selected from the group consisting of polyepoxide-substituted aromatic hydrocarbons, aliphatic hydrocarbons, cycloaliphatic hydrocarbons, ethers thereof, esters thereof, imines thereof, and combinations thereof. The polyepoxide can include hydrocarbons with two or more epoxide groups and one or more aromatic, aliphatic, cycloaliphatic, ether, ester, and/or imine groups in the hydrocarbon to which the epoxide groups are attached. Suitable polyepoxides can be derived from petroleum and plant materials. Suitable polyepoxides include two or more glycidyl ether groups (i.e., epoxide-containing groups). Some examples of polyepoxides include, but are not limited to, bisphenol A epoxy (e.g., diglycidyl ether of bisphenol A having 1 or 2-25 bisphenol A repeat units), bisphenol F epoxy (e.g., diglycidyl ether of bisphenol F having 1 or 2-25 bisphenol F repeat units), epoxy phenol novolac, epoxy cresol novolac, cycloaliphatic epoxies, halogenated epoxies, epoxy-vinyl esters, tetraglycidylmethylenedianiline (TGMDA), 3,4-epoxycyclohexylmethyl 3,4-epoxycyclohexanecarboxylate (ECC), bis[3,4-epoxycyclohexylmethyl] adipate (BECHMA), poly(glycidyl methacrylate), epoxies of rosin acid, epoxies of diphenolic acid, epoxies of tannin acid, epoxies derived from glucose, isosorbide epoxies, eugenol epoxides, furan epoxides, cathechin epoxides, vanillin-based epoxies, quercetin epoxides, epoxies derived from gallic acid, epoxides from phenols, epoxides from cardanols, epoxides from plant oils, terpene oxides (e.g., limonene dioxide), and combinations thereof. Vinyl groups (e.g., (meth)acrylic/acrylate groups) are generally reactive with the amino group of the amino-functional polymer via a hydroamination reaction to form —C—N— linkages between the amino-functional polymer and the functionalized omniphobic polymer. A vinyl-functional functionalized omniphobic polymer can be provided, for example, as a reaction product between a (meth)acrylic acid and an amine-functionalized omniphobic polymer such as an amino-functional polysiloxane. An aldehyde-functional functionalized omniphobic polymer can be provided, for example as an aldehyde-functional polysiloxane for reaction with chitosan or other amino-functional polymer.

Examples of general classes of functionalized omniphobic polymers include functionalized polysiloxanes, functionalized polyperfluoroethers, functionalized polybutadienes, functionalized polyolefins (e.g., polyethylene, polypropylene, polybutylene), functionalized poly(meth)acrylates, functionalized polyesters (e.g., low-Tg polyesters such as low molecular weight poly(lactic acid), poly(hydroxyalkanoates)), functionalized vegetable oils, and combinations or mixtures thereof. The functionalized polyperfluoroether (e.g., functionalized polyperfluoropolyethers) can include mono-, di-, or higher functionalized polyperfluoroethers, or a blend of thereof, such as a blend of mono- and di-functional polyperfluorothers. The functionalized polybutadiene can include mono-, di-, or higher functional polybutadienes, or a blend of thereof, such as a blend mono- and di-functional polybutadienes. Many suitable functionalized omniphobic polymers are commercially available (e.g., amine-, isocyanate-, or other functional polydimethylsiloxane (PDMS) with a variety of available degrees of functionality and molecular weights). Omniphobic polymers that are not commercially available in their functionalized form can be functionalized using conventional chemical synthesis techniques, for example including but not limited to hydroamination, thiol-ene Michael reaction of amine-carrying thiols, Mitsunobu reaction, and reductive amination.

The degree of functionality of the functionalized omniphobic polymer is not particularly limited and can be one or more than one. In an embodiment, the functionalized omniphobic polymer is a mono-functional functionalized omniphobic polymer having only a single functional group reactive with the amino groups of the (neutralized) chitosan coating or other amino-functional polymer, such as at a terminal or an internal location of the omniphobic polymer. In an embodiment, the functionalized omniphobic polymer is a di-functional functionalized omniphobic polymer having only two functional groups reactive with the amino groups of the (neutralized) chitosan coating or other amino-functional polymer, such as at terminal or internal locations of the omniphobic polymer. In an embodiment, the functionalized omniphobic polymer is a poly-functional functionalized omniphobic polymer having three, four, or more functional groups reactive with the amino groups of the (neutralized) chitosan coating or other amino-functional polymer, such as at terminal locations of the hydrophobic polymer and/or as pendant groups along the backbone of the omniphobic polymer.

The functionalized polysiloxane is not particularly limited and generally can include any polysiloxane having mono-, di-, or higher degrees functionality. In some embodiments, the functionalized polysiloxane includes a mono-functional polysiloxane. In some embodiments, the functionalized polysiloxane includes a di-functional polysiloxane. The polysiloxane can be a polydialklylsiloxane having —Si($R_1R_2$)—O— repeat units, where $R_1$ and $R_2$ independently can be $C_1$-$C_{12}$ linear or branched alkyl groups, $C_4$-$C_{12}$ cycloalkyl groups, unsubstituted aromatic groups, or substituted aromatic groups, in particular where $R_1$ and $R_2$ are methyl groups for a polydimethylsiloxane (PDMS). The functional groups are suitably terminal groups. For example, in an isocyanate-functional polydialklylsiloxane, the structure and terminal groups can be represented by (O=C=N)—$R_3$—[Si($R_1R_2$)—O]$_x$—$R_3$—(N=C=O) for a diisocyanate or (O=C=N)—$R_3$—[Si($R_1R_2$)—O]$_x$—$R_3$ for a monoisocyanate, where $R_3$ can be any suitable linking or terminal group. For example $R_3$ independently can be H (when a terminal group) or $C_1$-$C_{12}$ linear or branched alkyl (when a terminal group or a linker for a terminal amine). The functional groups additionally can be pendant groups, for example in an isocyanate-functional polydialklylsiloxane represented by $R_3$—[Si($R_1R_2$)—O](—[Si($R_{1'}R_{2'}$)—O]$_y$$R_3$, where $R_{1'}$ and $R_{2'}$ independently can be the same as $R_1$ and $R_2$, but at least one or both of $R_{1'}$ and $R_{2'}$ independently is a $C_1$-$C_{12}$ linear or branched alkyl linker group with a terminal isocyanate group. Illustrative epoxide-functional polydialklylsiloxanes can be represented by the foregoing structures with epoxide groups replacing the isocyanate groups, and likewise for other functional groups besides epoxides and isocyanates. Some examples of functionalized polyslioxanes include functionalized polydimethylsiloxane, functionalized polymethylphenylsiloxane, and functionalized polydiphenylsiloxane.

As described above, the functionalized omniphobic polymer can be an isocyanate-functionalized polysiloxane, for example having one or more isocyanate groups for the functional group of the functionalized omniphobic polymer. In an embodiment, the isocyanate-functionalized polysiloxane can be a reaction product of an amine-functionalized polysiloxane and a polyisocyanate. The amine-functionalized polysiloxane can be a mono-, di-, or poly-amine functionalized polysiloxane. For example, in an amine-functional polydialklylsiloxane, the structure and terminal groups can be represented by $NH_2$—$R_3$—[Si($R_1R_2$)—O]$_x$—$R_3$—$NH_2$ for a diamine or $NH_2$—$R_3$—[Si($R_1R_2$)—O]$_x$—$R_3$ for a monoamine, where $R_1$, $R_2$, and $R_3$ are as described above. The polyisocyanate can be di-, tri-, or higher functional such as a diisocyanate, triisocyanate, blend of multiple polyisocyanates with same or different functionality. Reaction between a general amine-functionalized omniphobic polymer and a polyisocyanate can be used to form the isocyanate-functionalized omniphobic polymer. The polyisocyanate can be 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethylmethane diisocyanate, di- and tetraalkyl-diphenylmethane diisocyanate, 4,4'-dibenzyl diisocyanate, 1,3-phenylene diisocyanate, 1,4-phenylene diisocyanate, one or more isomers of tolylene diisocyanate (TDI), 1-methyl-2,4-diiso-cyanatocyclohexane, 1,6-diisocyanato-2,2,4-trimethyl-hexane, 1,6-diisocyanato-2,4,4-trimethylhexane, 1-iso-cyanatomethyl-3-isocyanato-1,5,5-trimethylcyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (HDI), HDI dimer (HDID), HDI timer (HDIT), HDI biuret, 1,5-pentamethylene diisocyanate (PDI), PDID (dimer of PDI), PDIT (trimer of PDI), PDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, and/or 1,2-diisocyanatododecane.

Some examples of polyperfluoropolyethers with functional group(s) include functionalized poly(n-hexafluoropropylene oxide) (e.g., —($CF_2CF_2CF_2O$)$_n$—)NCO for isocyanate groups) and functionalized poly(hexafluoroisopropylene oxide) (e.g., —(CF($CF_3$)$CF_2O$) n NCO or PFPO-NCO). Some examples of functionalized atactic polyolefins include functionalized poly(l-butene), branched polyethylene, poly(cis-isoprene), poly(trans-isoprene), and poly (1-octene). Some examples of functionalized polyacrylates include poly(3-functionalized propyl acrylate). Similarly, mono-functional polymers include mono-functional polyisobutylene (e.g., PIB-NCO), mono-functional poly-polyethylene glycol (e.g., PEG-NCO), mono-functional poly(l-butene) (e.g., PB-NCO, cis and trans) can also be used as the low-glass transition temperature ($T_g$ less than 70° C. or 50° C.) polymers, either alone or in combination with other functionalized omniphobic polymers.

The functionalized omniphobic polymers can have any suitable molecular weight in view of desired glass transition temperature, for example having a molecular weight ranging from 300 to 50,000 g/mol or 300 to 300,000 g/mol. In various embodiments, the molecular weight can be at least 300, 800, 1000, 1500, or 2000 and/or up to 1000, 2000, 3000, 5000, 50,000, 150,000, or 300,000 g/mol. The molecular weight can be expressed as a number-average or weight-average value in the units of gram/mole (g/mol). Alternatively or additionally, the functionalized omniphobic polymer can have a number of repeat units ranging from 4 to 600 (e.g., at least 4, 10, 12, 15, 20, or 25 and/or up to 12, 15, 20, 30, 40, 60, 200, or 600; such as a (number) average number of repeat units). Some embodiments can include a blend of two or more functionalized omniphobic polymers with different average molecular weights, such as one with 300-1500 g/mol and another with 1500-50,000 g/mol with a higher average molecular weight than the first. Blends of functionalized omniphobic polymers (e.g., differing in molecular weight and/or in degree of functionality) can improve the combination of water- and oil-repellency properties of the final composition. For example, a monofunctional polysiloxane can provide better water and oil repellency than a di-functional polysiloxane. Low MW functionalized polysiloxanes (e.g., PDMS, such as having a MW range of about 800-1200 g/mol or an average MW of about 1000 g/mol) can provide an improved water repellency, while Higher MW functionalized polysiloxanes (e.g., PDMS, such as about 2000 g/mol or above for an average or range of MVV) can provide an improved oil repellency.

The amino-functional polymer and the functionalized omniphobic polymer can be incorporated into the omniphobic composition or coating in any desired relative amounts, whether compared to omniphobic composition itself or the underlying porous substrate. For example, the omniphobic coating can have an amino-functional polymer content in a range from about 0.1 wt. % to 20 wt. % relative to the porous substrate, such as at least 0.1, 1, 2, 3, 4, or 6 wt. % and/or up to 5, 8, 10, 12, 15, or 20 wt. %. Similarly, the omniphobic coating can have a functionalized omniphobic polymer content in a range from about 0.1 wt. % to 5 wt. % or 0.1 wt. % to 10 wt. % relative to the porous substrate, such as at least 0.1, 0.2, 0.5, 1, 1.5, or 2 wt. % and/or up to 1, 2, 3, 4, 5, 6, 8, or 10 wt. %. The omniphobic composition or coating can have a weight ratio of amino-functional polymer relative to functionalized omniphobic polymer of at least 0.5, 1, or 2, such as in a range from 2 to 20.

In an embodiment, the omniphobic coating has a molar ratio of amino-functional polymer amino groups relative to linkages with the functionalized omniphobic polymer in a range from 1 to 30 or 1 to 90. This can represent amine groups and ammonium groups combined, for example in chitosan or otherwise. The linkages can be graft or cross-linking linkages, for example including urea group linkages for isocyanate reactions with amino groups. More generally, the molar ratio can be at least 1, 4, 6, 8, 10, 12, or 15 and/or up to 12, 15, 20, 25, 30, 45, 60, 75, or 90 for moles/number amine and/or ammonium groups:moles/number linking (e.g., urea) groups. Similar ranges can apply for moles/number amino groups:moles/number linking groups (e.g., when most or essentially all of the ammonium groups were converted to amine groups before reaction). Generally only a fraction of the amino groups in the amino-functional polymer (chitosan or otherwise) are reacted to covalently attach the functionalized omniphobic polymer (e.g., via urea or other linkages).

In an embodiment, the omniphobic composition or coating can include any suitable organic or inorganic filler or additive, which can be included to improve one or more of mechanical properties, optical properties, electrical properties, and omniphobic properties of the final composition. The fillers can be added in the range from 0.01 wt. % to 10 wt. %, for example in range from 1 wt. % to 5 wt. %. Example additives include nanoclay, graphene oxide, graphene, silicon dioxide (silica), aluminum oxide, cellulose nanocrystals, carbon nanotubes, titanium dioxide (titania), diatomaceous earth, biocides, pigments, dyes, and/or thermoplastics. The additives can be included in the (aqueous) coating mixture as applied to the porous substrate. For example, the additives can be included in a solution or mixture containing the omniphobic coating composition (e.g., functionalized chitosan or otherwise) before it is applied to the substrate. In other embodiments, the additive can be included in a solution or mixture containing the amino-functional polymer (e.g., chitosan or otherwise) before it is applied to the substrate and then subsequently functionalized with the functionalized omniphobic polymer. One function of the fillers is to seal the substrate pores, in particular at relatively low levels of amino-functional polymer usage. For example, the inner bulk of the paper or another porous substrate may still have some trapped pores/air, but the top pores are sealed with the amino-functional polymer behaving as a sealant (or glue) along with the fillers. Without fillers, the amino-functional polymer could diffuse into the inner bulk. Also, fillers can bring color to the substrate (e.g., paper), for example using titanium dioxide filler particles as a whitening agent. Biocidal properties also can be incorporated via nanofiber fillers.

The omniphobic properties of the omniphobic composition (e.g., as a coating on a substrate) can be characterized in terms of one or more contact angles and/or sliding angles for water and/or oil droplets (e.g., vegetable oil and/or hexadecane) on the thermoset composition (e.g., as a coating on a substrate). The following ranges are representative of compositions according to the disclosure which display favorable omniphobic properties. In an embodiment, the composition has a water contact angle in a range from 90° to 120° (e.g., at least 90°, 95°, 100°, or 105° and/or up to 110°, 115°, or 120°; such as for the cured composition as a coating). In some cases, the water contact angle can be up to about 125° for non-smooth or rough surfaces. In an embodiment, the composition has an oil contact angle in a range from 0° or 1° to 65° (e.g., at least 1°, 10°, 20°, or 30° and/or up to 40°, 50°, 60°, or 65°; such as for the cured composition as a coating). In an embodiment, the composition has a water sliding angle in a range from 0° or 1° to 30° for a 75 µl droplet (e.g., at least 1°, 2°, 4°, 6°, or 8° and/or up to 10°, 15°, 20°, or 30°; such as for the cured composition as a coating). In an embodiment, the composition has an oil sliding angle in a range from 0° or 1° to 20° for a 25 µl droplet (e.g., at least 1°, 2°, 4°, 6°, or 8° and/or up to 10°, 12°, 15°, or 20°; such as for the cured composition as a coating). The contact angles for the omniphobic coatings can be higher when nanofillers (e.g., clay, silica, etc.) are included in the composition as compared to corresponding compositions without any nanofillers.

The omniphobic composition or coated article can be additionally characterized for its water- and/or oil-resistance based on one or more of water permeability, water uptake, and kit rating. For example, the omniphobic coated article can have a relative permeability for water vapor of 0.7 or less, such as at least 0.01, 0.1, 0.2, or 0.3 and/or up to 0.3, 0.4, 0.5, 0.6, or 0.7 relative permeability. The permeability is relative to a corresponding porous substrate without the omniphobic coating thereon, such as based on absolute water vapor transmission rates for the coated article and uncoated porous substrate. The omniphobic coated article can have a relative uptake (or gain) for liquid water of 0.7 or less, such as at least 0.01, 0.1, 0.2, or 0.3 and/or up to 0.3, 0.4, 0.5, 0.6, or 0.7 relative uptake. The uptake is relative to a corresponding porous substrate without the omniphobic coating thereon, such as based on absolute liquid water uptake or gain rates (such as in mass/area) for the coated article and uncoated porous substrate. The omniphobic coated article can have a kit rating of 7 to 12, such as 7, 8, 9, 10, 11, or 12, as determined by TAPPI Standard Method T 599 pm-96.

Method of Making Composition and Coated Article

The omniphobic (polymeric) composition and corresponding coated article using the same can be formed in a variety of ways. In some embodiments, the amino-functional polymer and the functionalized omniphobic polymer can be reacted with each other to form the corresponding omniphobic composition prior to applying the composition to a porous substrate, such as in the form of a solution or dispersion, followed by drying to leave the omniphobic composition as a coating adhered to the porous substrate. In some embodiments, the amino-functional polymer and the functionalized omniphobic polymer can be applied to the substrate as separate, unreacted components. For example, the amino-functional polymer can be applied to the substrate, such as in the form of a solution or dispersion, and followed by drying to leave the amino-functional polymer as a coating adhered to the porous substrate. The functionalized omniphobic polymer can then be applied to the amino-functional polymer on the substrate, such as in the form of a solution or dispersion, and followed by drying to react with the amino-functional polymer and form the resulting omniphobic composition as a coating adhered to the porous substrate.

In an embodiment as illustrated by panels (B) and (C) of FIG. 3, the coated article 300 can be formed by applying the omniphobic coating 100 to the porous substrate 200 and top surface 202 thereof according to the following process. The amino-functional polymer is applied as a first coating 100A on the porous substrate 202. The amino-functional polymer as applied can include cationic ammonium groups (e.g., —$NH_3^+$ groups), for example as a result of acidification of pendant amine (—$NH_2$) groups of native amino-functional polymer or chitosan with an acid for dissolution in water and coating of the cellulosic or other porous substrate 200. The amino-functional polymer generally forms a smooth outer coating surface 100A, with the amino-functional polymer penetrating and filling internal pores of the underlying cellulosic substrate 200. In some cases, the amino-functional polymer coating 100A can be neutralized, thereby converting at least some of the cationic ammonium groups to (non-ionic) amine groups (e.g., —$NH_2$ groups) and providing a neutralized amino-functional polymer coating 100A. Neutralization is preferable, but not required, when the amino-functional polymer coating includes cationic ammonium groups. At least some ammonium groups (but not necessarily all) are preferably converted to corresponding amine groups for subsequent reaction/linking with the functionalized omniphobic polymer. The functionalized omniphobic polymer is then applied as a second coating 100B to the amino-functional polymer coating 100A, for example a top surface thereof opposite the interface between the coating 100A and the substrate 200. The amino groups of the amino-functional polymer coating 100A then react with the functional groups of the functionalized omniphobic polymer layer 100B to covalently link the two components and form the omniphobic coating 100 on the porous substrate 200. This final reaction or (full) curing step incorporates the functionalized omniphobic polymer into the amino-functional polymer by reaction with the amino groups from the amino-functional polymer. The omniphobic (polymeric) coating, whether made by this step-wise method, a one-pot method prior to application (as described below), or otherwise can generally be characterized as a graft polymer or a crosslinked (or thermoset) polymer. Chitosan, as an illustrative amino-functional polymer has multiple free amino groups. If the amino-functional polymer is reacted with a mono-functional functionalized omniphobic polymer (e.g., PDMS-mono reactive functionality (such as isocyanate, epoxy)), the resulting omniphobic coating includes grafted functionalized omniphobic polymer segments. If the amino-functional polymer is reacted with a poly-functional functionalized omniphobic polymer (e.g., PDMS-di or multiple reactive functionalizes), the resulting omniphobic coating includes crosslinking functionalized omniphobic polymer segments. In the illustrative examples using HDIT as linker between PDMS and chitosan, the PDMS-NCO generally has one or two free isocyanate groups, which can result in a crosslinked system between neighboring chitosan chains.

The amino-functional polymer can be applied to the substrate 200 in a mixture including water and the amino-functional polymer, for example with the cationic ammonium groups. The porous substrate 200 is then dried to remove at least some of the water from the mixture and forming the amino-functional polymer coating 100A on the porous substrate. The amino-functional polymer mixture, in particular a chitosan mixture, is generally provided as an aqueous mixture or solution, for example in a weak or strong acid solution at a pH value sufficiently low to protonate the pendant amine (—$NH_2$) groups of native chitosan, thus making the chitosan water-soluble and forming the cationic ammonium groups (—$NH_3^+$) groups. A suitable aqueous acidic solution is about 2% (v/v) acetic acid in water, although higher or lower concentrations can be suitably used. The amino-functional polymer can be included in the mixture at a concentration in a range from 0.1 g/100 ml to 5 g/100 ml coating mixture. Any of spraying, casting, rolling, dipping, etc. can be used to apply the amino-functional polymer mixture to the porous substrate. Drying to evaporate/remove water can be performed with or without the application of external heat, for example by simply drying in ambient (room temperature) conditions, such as at about 20-30° C. Elevated drying temperatures can be used if desired to increase drying speed.

When the amino-functional polymer mixture or corresponding coating includes the cationic ammonium groups, the amino-functional polymer coating can be neutralized before application of the functionalized omniphobic polymer. The amino-functional polymer coating neutralized by contact with a neutralizing agent. The neutralizing agent can be a suitable base (e.g., weak base, strong base, conjugate base), for example in an aqueous solution applied by spraying, casting, rolling, dipping, etc. and followed by drying. Sodium bicarbonate is a suitable neutralizing agent.

The functionalized omniphobic polymer can be applied to the amino-functional polymer coating in the form of a mixture including a solvent and the functionalized omniphobic polymer. The solvent can an aprotic organic solvent such as acetone, tetrahydrofuran, 2-butanone, esters (e.g., methyl, ethyl, n-propyl, butyl esters of acetic acid such as n-butyl acetate, etc.), dimethylformamide, dimethyl carbonate, etc. In some embodiments, the mixture can include a catalyst to promote selective bonding between the omniphobic polymer and the amino groups. In other embodiments, the mixture can be free from added catalyst (e.g., with epoxy or isocyanate functional groups that are sufficiently reactive without a catalyst). The mixture can be applied by spraying, casting, rolling, and dipping as well. In a further refinement, the method comprises after applying the functionalized omniphobic polymer to the amino-functional polymer coating, drying the coated substrate to remove the solvent. Drying can be performed at ambient conditions and before heating to accelerate the reaction to form the fully cured omniphobic coating. However, most of the reaction between the amino-functional polymer and the functionalized omniphobic polymer can occur during drying, but some of the reaction may occurs after solvent removal. Drying can also provide some time for the functionalized omniphobic polymer as applied to the external surface of the neutralized chitosan coating to penetrate into interior of the amino-functional polymer coating. Depending on the thickness of the amino-functional polymer coating and the drying time before applying heat for full curing, functionalized omniphobic polymer can be incorporated into either an exterior/top region of the final omniphobic coating, or it can be distributed substantially throughout the omniphobic coating. For example, for sufficiently long drying times and/or sufficiently thin amino-functional polymer coatings, the functionalized omniphobic polymer can penetrate essentially completely through the coating to the substrate 200 prior to curing. Thus, in some cases, the omniphobic coating 100 can be qualitatively illustrated as in panel (C) of FIG. 3 as an inhomogeneous or composite-type structure, with two regions 100A, 100B containing primarily amino-functional polymer and functionalized omniphobic polymer, respectively, along with an interfacial region where the two components are mixed and covalently reacted/bonded with each other. In some cases, the omniphobic coating 100 can be qualitatively illustrated as in panel (A) of FIG. 3, where sufficient diffusion and mixing during drying/curing substantially eliminates the traces of the original layers 100A, 100B and results in a substantially homogenous coating 100.

Reacting the amino groups of the amino-functional polymer coating with the functional groups (e.g., isocyanate, epoxy, active alkene) of the functionalized omniphobic polymer can be performed at any suitable time and temperature conditions. For example, reacting/curing can be performed at a temperature from 0° C. to 180° C. and for a time from 10 min to 10 days. Curing can be performed at room temperature or by heating, such as in an oven, with exposure to a heat lamp, etc., for example at a temperature from 80° C. or 100° C. to 140° C. or 180° C. and/or for a time from 10 min, 20 min, 30 min, 1 hr, 2 hr, or 4 hr and/or up to 1 hr, 2 hr, 4 hr, 6 hr, 12 hr, or 24 hr. Lower heating temperature or ambient temperature curing also possible, such as room temperature curing (e.g., 20° C. to 30° C.) for 6 hr, 12 hr, 1 day, 2 day, or 5 day to 2 day, or 5 day, 10 day; or lower heating (e.g., 30° C. or 40° C. to 60° C.) for 2 hr, 6 hr, 12 hr, or 1 day to 2 day or 4 day; or 60° C. to 80° C. for 2 hr, 6 hr, or 12 hr to 1 day or 3 day.

In an embodiment as illustrated by panel (A) of FIG. 3, the coated article 300 can be formed by applying the omniphobic coating 100 to the porous substrate 200 and top surface 202 thereof according to the following process. The amino groups of the amino-functional polymer (e.g., chitosan) are first reacted with the functional groups of the functionalized omniphobic polymer in a liquid reaction medium to form an omniphobic polymer reaction product. The reaction medium can include one or more of an organic solvent and acid-free water. The omniphobic polymer reaction product can be a graft or (partially) crosslinked polymer, for example in suspension as a result of micelles formation. The omniphobic polymer reaction product is then applied to the porous substrate 200, for example either directly or indirectly from the liquid reaction medium. The porous substrate 200 is then dried to removing any solvent or suspending medium from the liquid reaction medium and/or further reacting/curing reaction system components, thereby forming the omniphobic coating 100 to the porous substrate and adhered thereto. Reaction solvents, drying times/temperatures, curing times/temperatures, reaction catalysts can be selected as described above.

In an embodiment as illustrated by panels (B) and (C) of FIG. 3, the coated article 300 can be formed by applying the omniphobic coating 100 to the porous substrate 200 and top surface 202 thereof according to the following process. An aqueous dispersion including omniphobic polymeric micelles dispersed is prepared, where the omniphobic polymeric micelles include the reaction product between the amino-functional polymer and the functionalized omniphobic polymer. The aqueous micelle dispersion is applied to the porous substrate 200. The porous substrate 200 is then dried to form the omniphobic polymeric coating 100 including the reaction product on the porous substrate 200.

The micelles and corresponding reaction product are generally amphiphilic in nature, having a water-soluble portion (e.g., from the amino-functional polymer) and a water-insoluble portion (e.g., from the functionalized omniphobic polymer), which two portions promote micelle formation in an aqueous medium. The micelles are omniphobic polymeric micelles because the amphiphilic micelles form an omniphobic polymeric coating after application to a porous substrate and drying. In an embodiment, the omniphobic coating and/or the micelle reaction product precursor thereof can have a weight ratio of amino-functional polymer relative to functionalized omniphobic polymer of at least 0.5, 1, or 2, such as in a range from 2 to 20. More generally, the ratio can be at least 0.5, 1, 2, 3, 4, 5, or 8 and/or up to 3, 4, 5, 7, 10, 12, 15, or 20 for the weight amino-functional polymer:weight functionalized omniphobic polymer in the omniphobic coating. The omniphobic polymeric micelles are oriented with a hydrophilic portion outward and hydrophobic portion inward. The hydrophobic portion corresponds to the functionalized omniphobic polymer, such as PDMS. The hydrophilic portion corresponds to the amino-functional polymer, such as chitosan or PEI, which has at least some hydrophilic groups. The hydrophilic groups can include unreacted amino groups, such as in unprotonated amine form and/or protonated ammonium form, and suitably further include one or more other groups such as hydroxyl groups, carboxylic groups, etc. In the case of chitosan as the amino-functional polymer, the hydrophilic groups providing stable aqueous micelles include hydroxyl groups and possibly unreacted amino groups, for example depending on degree of functionalization with the functionalized omniphobic polymer. Micelles are suitably formed at acidic conditions (e.g., pH of 5 or less or 6 or less) or basic conditions (e.g., pH of 8 or more or 9 or more). The acidic or basic conditions promote micelle formation by promoting the water solubility of the amino-functional polymer portion of the graft reaction product (e.g., chitosan, which is readily water-soluble at low and high pH values). Suitable weight ratios for the hydrophilic portion (amino-functional polymer) and hydrophobic portion (functionalized omniphobic polymer) in the micelle-forming omniphobic polymer can range from 1:2 to 1:0.1 for hydrophilic:hydrophobic portions, such as up to 1:1, 1:1.2, 1:1.5, or 1:2 and/or at least 1:0.1, 1:0.2, 1:0.4, 1:0.6, or 1:1. The aqueous dispersion generally includes the omniphobic polymeric micelles at a concentration of 0.1 wt. % to 10 wt. %.

The aqueous dispersion of omniphobic polymeric micelles can be formed by reacting the amino groups of the amino-functional polymer with the functional groups of the functionalized omniphobic polymer in an aqueous reaction medium to form the omniphobic polymer micelle reaction product dispersed in the aqueous reaction medium. Suitably, the aqueous reaction medium has an acidic or basic pH value, for example a pH value of up to 6 or greater than 8. Reaction to form micelles can be performed in an acidic medium, for example having a pH value of at least 1, 2, 3, or 4 and/or up to 3, 4, 5, or 6, such as about 4-5 or 4-6. Reaction to form micelles can be performed in a basic medium, for example having a pH value of at least 8, 9, 10, 11, or 12 and/or up to 11, 12, 13, or 14, such as about 8-12, 8-11, or 10-12. The reaction medium generally includes water and one or more acid, base, and/or buffer components to maintain the desired pH value and promote micelle formation.

Applying the aqueous dispersion to the substrate can include dip coating, spraying, using a drawdown bar (e.g., wire wound applicator), etc. Drying removes the water (and any other co-solvents present), during which process the omniphobic polymeric micelles structurally re-orient themselves such that the hydrophilic portion generally fills the pores of the porous substrate, thereby imparting oil resistance to the coated substrate, and the hydrophobic portion is generally at the outer, exposed or external surface of the coating, thereby imparting water resistance to the coated substrate. When the porous substrate is a cellulosic substrate or other substrate including hydrogen bonding groups such as hydroxyl and/or amino-groups, the re-orientation of the omniphobic polymeric micelles further includes the formation of hydrogen bonds between the substrate and the omniphobic polymeric coating as a means for adhesion. Such adhesion is generally non-covalent and is reversible during recycling treatment of the coated substrate by aqueous extraction under appropriate conditions to remove and separate the omniphobic polymeric coating from the underlying substrate.

EXAMPLES

The following examples illustrate the disclosed compositions and methods, but are not intended to limit the scope of any claims thereto. In the following examples, omniphobic compositions generally according to the disclosure are prepared and applied as a film or coating on a porous substrate such as paper. The applied films or coatings can then be evaluated according to a variety of tests as described below in order to characterize their relative degree of omniphobicity.

Contact Angle: Contact angles (see FIG. 1) are determined by applying a liquid droplet on a test coating surface that is stationary and horizontal with respect to gravity. Any specified liquids can be used, but omniphobic coatings are generally characterized by determining contact angles for water droplets and separately for oil droplets (e.g., a cooking or other common vegetable oil, hexadecane or other oily liquid hydrocarbon). The applied droplets have a volume of about 5 µl (e.g., about 3 µl to 10 µl), although the measured contact angle is not particularly sensitive to actual droplet volume in these ranges. Once applied to the test coating, the droplet can be visually interrogated through any suitable means to determine the contact angle (e.g., using conventional digital image photography and digital image analysis). Suitably, (cured) omniphobic composition coatings according to the disclosure have a water contact angle in a range from 90° to 120° (e.g., at least 90°, 95°, 100°, or 105° and/or up to 110°, 115°, or 120°). Suitably, (cured) omniphobic composition coatings according to the disclosure have an oil contact angle in a range from 10° to 65° (e.g., at least 10°, 20°, or 30° and/or up to 40°, 50°, 60°, or 65°).

Sliding Angle: Sliding angles are determined by applying a liquid droplet on a test coating surface that is initially horizontal with respect to gravity. The test coating surface is then gradually ramped at a controlled/known angle relative to the horizontal plane. Droplets which do not initially spread will remain stationary on the test surface until the test surface is ramped to a sufficiently high angle to cause the droplets to slide down the ramped test surface. The test surface angle at which sliding begins is the sliding angle of the test coating. Any specified liquids can be used, but omniphobic coatings are generally characterized by determining contact angles for water droplets and separately for oil droplets (e.g., a cooking or other common vegetable oil, hexadecane or other oily liquid hydrocarbon). The applied droplets have a specified volume, which is generally about 75 µl (e.g., about 50 µl to 150 µl) for water and about 20 µl (e.g., about 5 µl to 40 µl) for oil. Once applied to the test coating, the droplet can be visually interrogated through any suitable means to determine the sliding angle (e.g., using conventional digital image photography and digital image analysis). Suitably, (cured) omniphobic composition coatings according to the disclosure have a water sliding angle in a range from 0° or 1° to 30° (e.g., at least 1°, 2°, 4°, 6°, or 8° and/or up to 10°, 15°, 20°, or 30°). Suitably, (cured) omniphobic composition coatings according to the disclosure have an oil contact angle in a range from 0° or 1° to 20° (e.g., at least 1°, 2°, 4°, 6°, or 8° and/or up to 10°, 12°, 15°, or 20°).

Water-Resistance: The water-resistance of paper can be measured as Cobb60 value that represents grams of water per square meter that a paper absorbs in 60 seconds when brought in contact with water. Cobb60 values were determined via a TAPPI standard T441 om-09 protocol, where a Cobb sizing tester (Buchel BV Inc. Utrecht, Netherlands) was used to allow DI water (100 mL) to come into contact with a 100-cm$^2$ specimen for 1 min. The weight of the water absorbed by the paper was calculated by the difference in the weight of each specimen before and after the test. The Cobb60 value is expressed in grams per square meter (g/m$^2$).

Oil/Grease-Resistance (Kit Rating): Oil/grease-resistance tests were performed in accordance with the T 559 pm-96 standard method. Oil/grease-resistance is represented by a kit rating value, where 12/12 denotes the maximum grease-resistance, and 0/12 corresponds to no grease-resistance. According to the method, a series of numbered solutions (1-12) with various surface tensions and viscosities (aggressiveness) were prepared by mixing specific proportions of castor oil, n-heptane, and toluene. Higher numbered solutions are more aggressive with lower surface energies (i.e., solution #1 is the least aggressive oil while #12 is the most aggressive oil). A test specimen was placed on a black bench, and various test solutions were gently allowed to drop onto the surface of the specimen from a height of 0.5 inches and quickly removed with a clean tissue after 15 s. The tested area was examined immediately and a specimen with darkened spots was considered to have failed the test. The number of the most aggressive solution that remained on the surface of a specimen without causing any failure was reported as the "kit rating." A higher kit rating indicates that the paper has stronger grease-resistance.

Example 1—Omniphobic Coatings on Cellulosic Substrates

Figure 4:
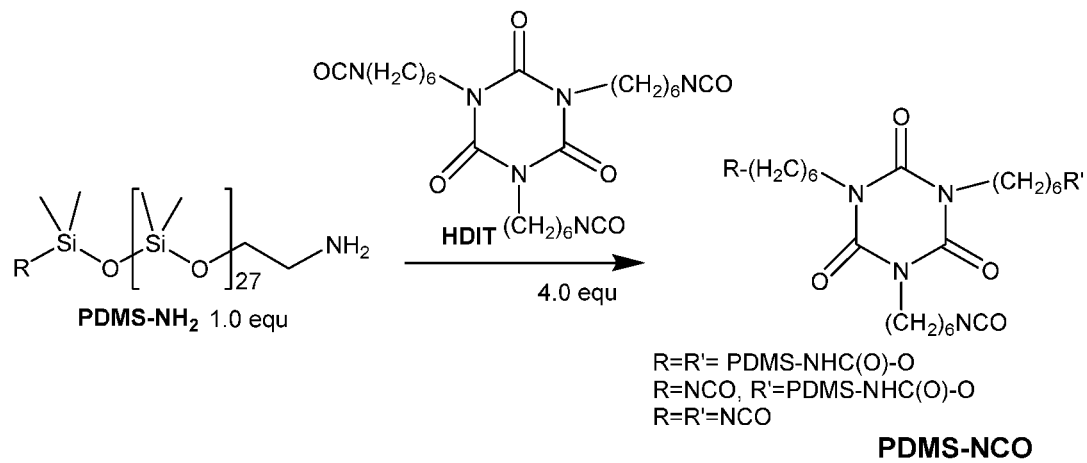
FIG. 4 illustrates a method for making an isocyanate-functional omniphobic polymer (illustrated as PDMS) from a corresponding polyisocyanate and amino-functional omniphobic polymer.
Figure 5:
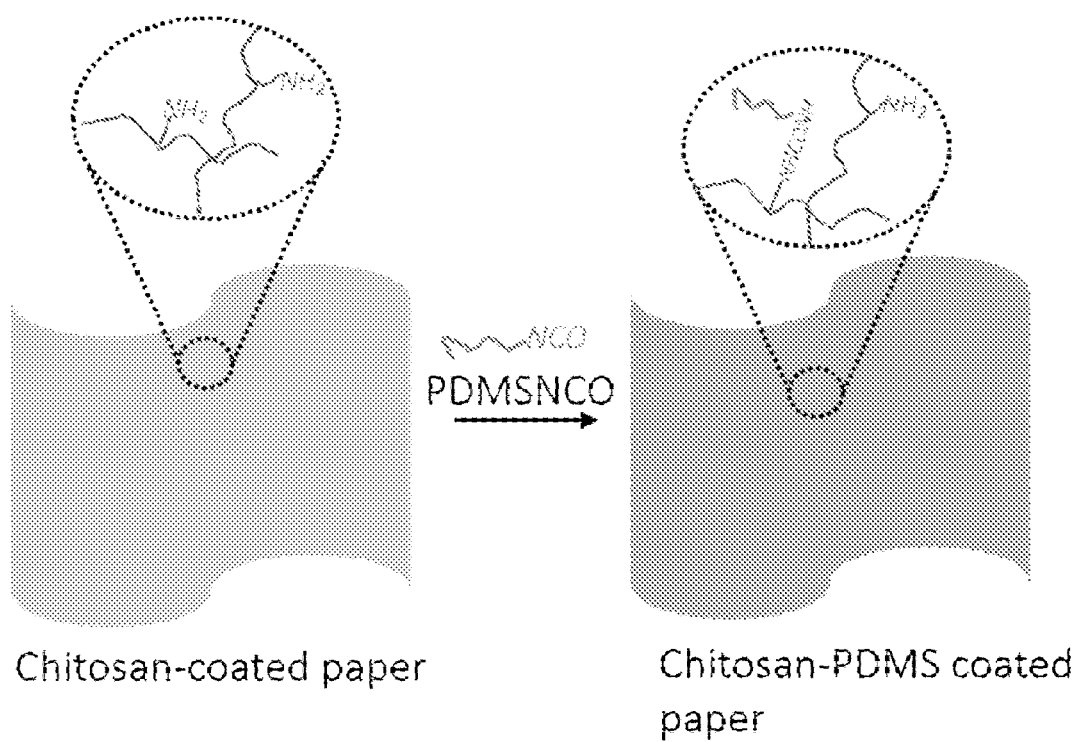
FIG. 5 illustrates a method for forming an omniphobic coated article according to the disclosure, in particular using a PDMS-functionalized chitosan polymer as an omniphobic coating polymer for a porous cellulosic (paper) substrate.

Example 1 illustrates the formation of coated, porous cellulosic (paper) substrates with an omniphobic coating according to the disclosure and including a PDMS-functionalized chitosan polymer. More specifically, the example utilizes chitosan and polydimethylsiloxane (PDMS) to create a mechanically durable, oil- and water-repelling, biodegradable coating for porous materials such as paper. Chitosan is first dissolved into acetic acid to create a liquid solution, which coats paper to reduce the amount of pores and create a smooth surface to which the PDMS can bond. Amino-functional PDMS is added drop wise to HDIT (a polyisocyanate) to create a solution of isocyanate-functional PDMS (FIG. 4). The chitosan-coated paper is then soaked in the isocyanate-functional PDMS solution to graft the polymers together via urea reaction products between isocyanate groups (on the PDMS) and amino groups (on the chitosan) (FIG. 5). The resulting coated paper substrates have demonstrated hydrophobicity, with contact angle of 95°, and a "kit rating" (a standard fat repellency rating) of 12 out of 12 (best possible repellency).

Summary: Water- and oil-resistant materials are useful for many applications, but turning porous substrates such as paper, corrugated board, cardboard, fabrics, and foams into a water- and oil-resistant is very challenging. This example illustrates a fluorine-free, water- and grease-resistant surface coating fabricated on a fully-porous substrate using paper as a model porous material. A chitosan coating was applied to render paper oil/grease-resistant, and then polydimethylsiloxane (PDMS) was applied to impart water-resistance as well as to further enhance the grease-resistance of the chitosan-coated paper. A Response Surface Methodology (RSM) was applied to evaluate suitable concentrations of chitosan and PDMS to obtain the desired water- and oil/grease-resistant properties. Paper coated with a load of 8.6 wt % of chitosan and 2.2% of PDMS showed an excellent grease/oil kit rating value of 12/12 (maximum fat resistance) as well as good water resistance (water contact angles of 95.2°). The coated paper was stable against solvents as confirmed by a solvent extraction test. Thus, the general omniphobic coatings according to the disclosure can be applied to various substrates, including paper, corrugated board, cardboard, fabrics, and foams, for example on disposable plates, cups, or other food-service items.

This example illustrates methods and corresponding articles to convert a porous substrate from a water- and grease-absorbent material into a water- and grease-resistant material. Paper was used as a model porous substrate. Chitosan was used to fill/mask the pores of the paper, and subsequent modification of chitosan with PDMS rendered the porous paper both grease- and water-resistant. The chitosan was applied using an aqueous chitosan solution to ensure that the surface of the paper was smooth, while the PDMS was applied as a second layer to render the paper water-repellent as well as to further enhance its grease-resistance. Chitosan is selected because it is a non-toxic, low-cost and fully-biodegradable polymer. PDMS is also biodegradable and is available at an affordable cost. This approach offers a good alternative to the existing fluorinated paper coatings used where water- and grease-repellency is required, because fluorinated materials have growing environmental concerns.

Materials: Acetone (Fischer Scientific, 99.7%), monoaminopropyl-terminated polydimethylsiloxane (PDMS-NH2 (2K), Mn=2000 g/mol, GELEST, Inc.) and chitosan (Sigma, Mn=50,000-190,000 g/mol) were purchased and used without further purification. Hexamethylene diisocyanate trimer (HDIT) was provided by a manufacturer and used as the polyisocyanate. Printing paper was purchased from a local supermarket.

Chitosan-PDMS-coated paper: A chitosan solution was prepared by dissolving a desired amount of chitosan in 2% (v/v) acetic acid solution via stirring for 12 h at room temperature. An isocyanate-functionalized PDMS (PDMS-NCO) solution was prepared by dissolving amino-functionalized PDMS (PDMS-NH2) in acetone and then adding the PDMS-NH2 drop-wise into an HDIT solution that was also prepared in acetone. To prepare PDMS-NCO at 5 wt %, a PDMS-NH2 solution (0.5 g of PDMS-2K in 5.0 mL of acetone) was added drop-wise into an HDIT solution (0.25 mg of HDIT in 5.0 mL of acetone). Freshly prepared PDMS-NCO solutions were used in when applying coatings.

Paper test substrates were coated in two steps. First, a paper substrate was coated with a chitosan solution on both sides using a rod coating machine (Model K303, RK Print-Coat Instruments Ltd, UK), and dried under ambient conditions for 1 h. The chitosan-coated paper was subsequently cut into 1.27 cm×2.54 cm or 2.54 cm×2.54 cm pieces, and completely soaked in a PDMS-NCO solution for 30 s prior to curing at 120° C. in an oven for 1 h. The reaction between the isocyanate groups of the PDMS and the amino groups of the chitosan provided an omniphobic coating on the paper, referred to as chitosan-PDMS-coated paper. For reference, paper coated with only chitosan was cured at 120° C. for 1 h ("chitosan-coated paper"). In addition, unmodified paper was employed as a blank control. The response surface methodology (RSM) was employed to evaluate the effect of concentrations of chitosan and PDMS-NCO coating solutions on corresponding water- and oil/grease-resistance. The concentrations of the chitosan solutions were varied within the range of 1-4 wt %, and the concentrations of PDMS-NCO solutions were varied between 0-10 wt %.

Water-gain tests: Water-gain tests were used to evaluate the water-resistance of the coated paper samples. Paper samples were preconditioned at 70° C. under vacuum for 1 h and the edges of each specimen were sealed with wax to prevent water diffusion. The initial weight of each sample was recorded. Samples were then soaked in distilled (DI) water for 24 h, and subsequently weighed after excess water had been wiped away from the surface with tissues to yield the final weight. The water-gain ($g/m^2$) value was then calculated as the difference in weights (final minus initial) normalized by the surface area of the test substrate.

Extraction of coated paper: Coated paper (1.27 cm×2.54 cm) was soaked into 5.0 mL of hexane and was gently shaken for 3 min. The hexane solution was then concentrated via rotary evaporation and characterized by NMR spectroscopy. For comparison, control samples were also extracted with hexane and their NMR spectra were recorded. The hexane-extracted paper specimens were dried at 70° C. for 1 h and were tested for their water- and oil-resistance. The chitosan-coated paper and unmodified paper were tested in a similar manner.

Sodium bicarbonate treatment: To neutralize the protonated chitosan coating, chitosan (1.0 wt %) coated paper was dipped into a 25 mL $NaHCO_3$ solution (0.25 M) twice for 5 s each time, and subsequently rinsed twice with DI water. This $NaHCO_3$-treated chitosan-coated paper was then soaked in a 5.0 wt % PDMS solution to obtain the top coating layer. These samples were subsequently subjected to water- and oil/grease-resistance tests. Also, these samples were extracted with hexane and the changes in the water- and oil/grease-resistance were measured.

IR analysis: IR spectra of unmodified paper, chitosan-coated paper and chitosan-PDMS-coated paper were recorded using a Shimadzu IR Prestige 21 FTIR spectrometer (Shimadzu Co., Columbia, Md.) with an attenuatedtotal-reflection (ATR) accessory (PIKE Technologies, Madison, Wis.). A total of 32 scans with a resolution of 4 cm$^{-1}$ over a spectral range of 4000-400 cm$^{-1}$ were performed for each sample.

Thermogravimetric analysis (TGA): TGA analysis was performed using a Q-50 thermogravimetric analyzer (TA Instruments, New Castle, Del.) to investigate the thermal stability and composition of the coated paper. Weight loss (%) was recorded as a function of the temperature between 23-600° C. Samples were heated at a constant heating ramp rate of 10° C./min under a nitrogen flow of 40 mL/min.

Gravimetric analysis: Gravimetric (basis weight) analysis was employed to determine the amount of chitosan and PDMS used. For basis weight analysis, paper specimens with dimensions of 2.54 cm×2.54 cm were weighed before and after coating to determine coating weight normalized by the surface area of the test substrate (g/m$^2$). Coating loadings were calculated separately based on the results obtained via TGA measurements and basis weight analysis.

Scanning electron microscopy (SEM): SEM analysis was performed using a JEOL 6610 SEM, (JEOL Ltd., Japan) system to investigate changes in the surface morphology of the paper at different stages of the coating process. Samples were mounted on aluminum discs with a carbon tab and coated with 10-nm-thick gold layer using a sputtering approach. All samples were examined with an accelerating voltage of 15 kV.

Water contact angle (WCA): The WCA measurements were conducted using a VCA 2000 goniometer (AST Products, Inc., MA, USA). Water droplets with volumes of 5 μL were applied on the surface of a specimen. Images of the droplets were taken 30 s and 5 min after their application onto the surface. Three measurements were performed on different areas of each sample, and the results are reported as the average of these three values.

Water vapor transmittance (WVTR): The WVTR measurements were determined in g/m$^2$ day at 23° C. and 50% RH using a PERMATRAN-W (Model 3/34, Mocon Inc. MN, USA) system, and the result was compensated to the WVTR value under 100% RH. Samples with a size of 2.54 cm×2.54 cm were masked in an aluminum sheet with a 5-mm-diameter circle opening in the middle to fit the sample holder. Samples were preconditioned under testing condition for 1 h prior to characterization. The carrier gas was nitrogen with a flow rate of 12 SCCM.

Results: To covalently graft PDMS onto chitosan-coated paper, PDMS-NCO was selected because the isocyanate groups (of PDMS) and the amino groups (of chitosan) can react efficiently and rapidly with one another. PDMS-NCO was formed via the reaction shown in FIG. 3. PDMS-NH2 was used at a low molar ratio relative to the HDIT to ensure that all PDMS chains carry one or more NCO as they are the part of HDIT. As used herein, "PDMS-NCO" refers to PDMS chains which bear one or two NCO groups (FIG. 4). Once PDMS-NCO was prepared and then applied onto chitosan-coated paper, the reaction between the amine and isocyanate groups occurs to form highly stable urea bonds (FIG. 5). Based on the weight of PDMS-NCO (2.2 wt %) and chitosan (8.6 wt %) added onto the paper during the coating process and the considering the molecular weight of the chitosan monomer (159.1 g/mol), the number of NH2 moieties was about 12 times that of the NCO moieties of the PDMS-NCO. The essentially full-consumption of NCO was confirmed via IR analysis by the absence of the NCO peak at 2270 cm$^{-1}$. In one instance, chitosan-coated paper was neutralized with a NaHCO$_3$ solution. This was followed by dip-coating in a PDMS-NCO solution.

Results for test Samples 1.1-1.12 are provided in Table 1 below, which includes water gain (i.e., water resistance) and kit rating (i.e., oil resistance) as a function of chitosan and PDMS concentration in the coating. The water-gain value increased with the concentration of chitosan but decreased with the concentration of PDMS, possibly due to the hydrophilic nature of chitosan and ultrahydrophobic nature of PDMS. With regard to the oil/grease-resistance, the kit rating value increased with both the chitosan and the PDMS loadings, possibly because chitosan is polar and has a low interaction with non-polar organic liquids. Based on the results, an omniphobic coating formed from 1.0 wt % chitosan and 5.0 wt % PDMS was identified as a preferred coating formulation.

TABLE 1

Water- and Oil/Grease-Resistance of PDMS-Chitosan Coatings

| Sample | Chitosan Conc. (% w/w) | PDMS-NCO Conc. (% w/w) | Water Gain (g/m$^2$) | Kit Rating (—) |
|---|---|---|---|---|
| 1.1 | 1 | 0 | 96.98 | 7 |
| 1.2 | 2.5 | 0 | 145.85 | 12 |
| 1.3 | 4 | 0 | 177.04 | 12 |
| 1.4 | 1 | 5 | 67.28 | 12 |
| 1.5 | 2.5 | 5 | 78.18 | 12 |
| 1.6 | 2.5 | 5 | 74.80 | 12 |
| 1.7 | 2.5 | 5 | 78.19 | 12 |
| 1.8 | 2.5 | 5 | 78.56 | 12 |
| 1.9 | 4 | 5 | 82.32 | 12 |
| 1.10 | 1 | 10 | 72.17 | 12 |
| 1.11 | 2.5 | 10 | 73.30 | 12 |
| 1.12 | 4 | 10 | 77.06 | 12 |

FTIR spectroscopy was used to validate the presence of chitosan and PDMS on the surfaces of the chitosan-coated and chitosan-PDMS-coated paper samples. The IR spectra reveal the presence of many broad peaks between 3200-3600 cm$^{-1}$, which correspond to the stretching vibrations of the OH groups of the uncoated paper, the stretching frequencies of the OH and NH2 moieties of the chitosan-coated paper, and the stretching frequencies the OH and NH2 of the chitosan-PDMS-coated paper. The difference between uncoated and chitosan-coated paper is revealed by the presence of a peak at 1546 cm$^{-1}$ in the spectrum of chitosan-coated paper attributed to the N—H bending of the amino groups of chitosan, thus indicating successful loading of the chitosan onto the paper. Meanwhile, the chitosan-PDMS-coated paper exhibits a peak at 1257 cm$^{-1}$ representing a —CH3 symmetric bending in Si—CH3, and a peak at 800 cm$^{-1}$ corresponding to the bending in Si—O—Si of PDMS. Meanwhile, the spectrum of the chitosan-PDMS-coated paper also exhibits a peak at 1546 cm$^{-1}$ belonging to the C—N bending of the chitosan.

TGA traces of the unmodified paper, chitosan-coated paper and chitosan-PDMS-coated paper were recorded to investigate the thermal stability as well as to quantify the coating loading (as a wt %). The weight loss below 120° C. can be attributed to the evaporation of moisture. Both chitosan and paper decompose at about 300° C. The moisture contents of the chitosan-coated paper and chitosan-PDMS-coated paper were higher than that of the unmodified paper. A small peak at about 400° C. in the TGA trace of the chitosan-PDMS-coated paper corresponds to the weight loss of PDMS. This peak corresponds to a PDMS loading of about 2 wt %, which is calculated as the difference between the weight losses encountered in the range of 380-420° C. for the chitosan-coated paper and the chitosan-PDMS-coated paper. Since the weight loss of chitosan was overlapped with that of the paper substrate, chitosan loading was calculated based on the basis weights of the different materials. The analysis confirmed that the coating loadings were 8.6 wt % and 2.2 wt % for chitosan and PDMS, respectively.

The water contact angles (WCAs) of unmodified paper, chitosan-coated paper and chitosan-PDMS-coated paper were also measured. One set of contact angles was obtained 30 s after the droplets had been applied onto paper, and the other set of contact angles was recorded 5 min after the application of the droplets. The results indicated that unmodified paper showed no resistance to water at all, and water permeated into the paper substrate in less than 5 min. In contrast, the chitosan coating imparted some water resistance to the paper, and the obtained WCA was 68.05° (after 30 s), which was significantly decreased to 49.26° after 5 min, thus indicating that it had poor water-resistance. This decrease corresponds to the absorption of water by the chitosan-coated paper. The WCA of chitosan-PDMS-coated paper was 95.25°, indicating that it possessed a hydrophobic surface, and the WCA decreased slightly to 90.95° after 5 min of contact.

Figure 6:
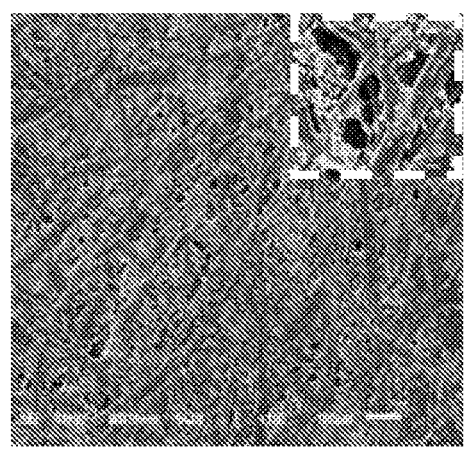
FIG. 6 provides SEM images (100× magnification) with zoomed-in pictures (1000× magnification) shown as insets in the upper right corners for unmodified paper (A), chitosan-coated paper (B) and chitosan-PDMS-coated paper (C).
Figure 6:
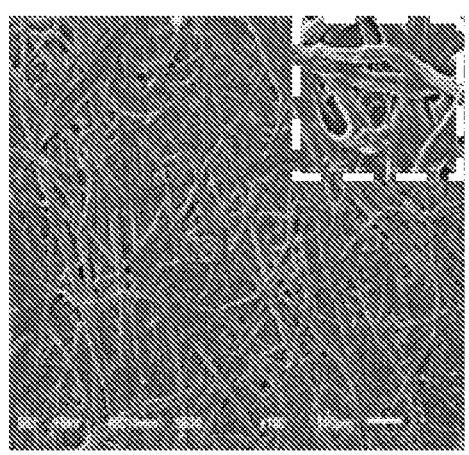
Figure 6:
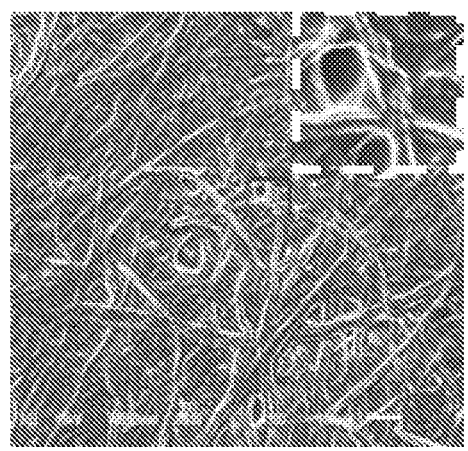

SEM characterization was employed to observe the surface features of the unmodified paper, chitosan coated paper and chitosan-PDMS coated paper as shown in FIG. 6. The pictures in the inset of each image represent magnified images (by 1000×) that were used to study the structure of the fibers. The cellulose fibers as well as the pores were clearly visible on the surface of the unmodified paper (FIG. 6, panel (A)). After chitosan coating, the cellulose fibers became smoother and were covered by a layer of chitosan, and the pores on the surface of the paper were filled (FIG. 6, panel (B)). In FIG. 6, panel (C), it can be seen that the surface of the chitosan-PDMS-coated paper was even much smoother and more uniform, and no pores were visible. It is evident that the hydrophilic nature and the porous texture of the paper responsible for its poor oil- and water-resistance were overcome by filling the pores and applying hydrophobic coatings.

Figure 7:
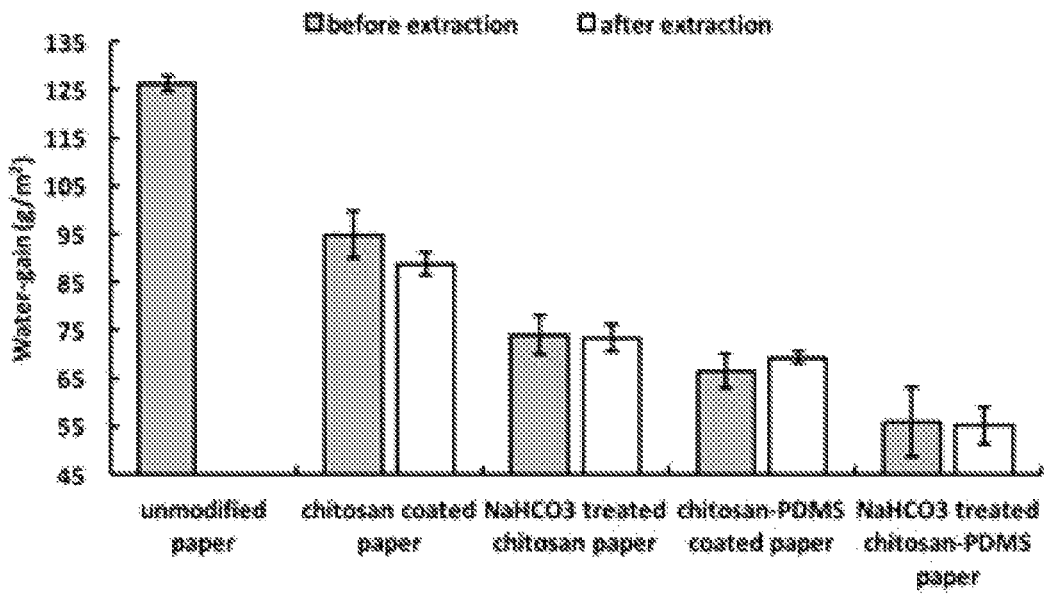
FIG. 7 illustrated the effect of hexane extraction on water- (A) and oil- (B) resistance properties of non- and sodium bicarbonate-treated paper coatings ("*" indicates a significant difference at the 95% confidential level based on Student's t-test).
Figure 7:
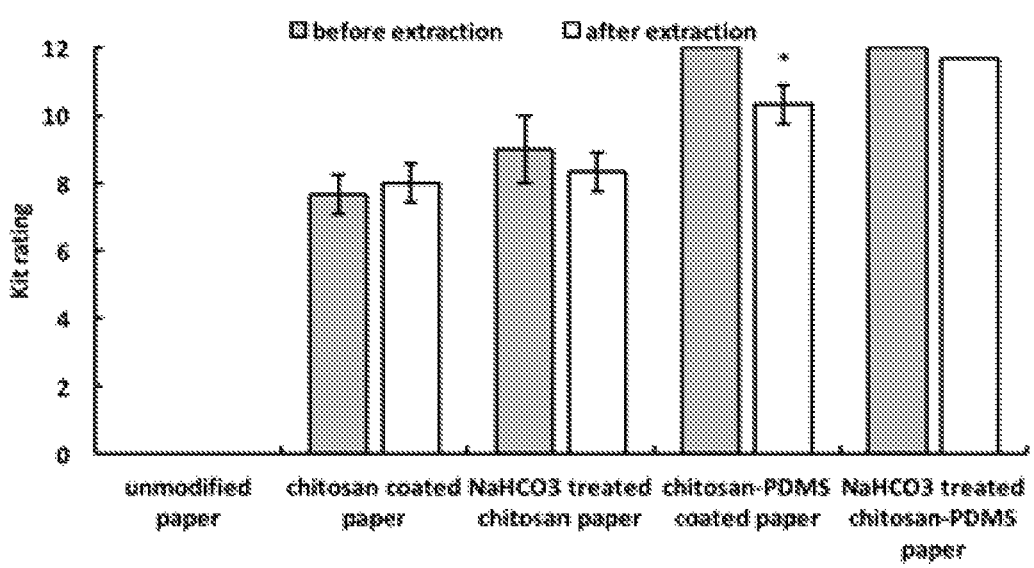

The effect of NaHCO$_3$ treatment on the chitosan coating prior to application of the PDMS-NCO coating was evaluated. The NaHCO$_3$ treatment was applied as an attempt deprotonate substituted ammonium (—NH$_3$+) ions of the chitosan when acidified with acetic acid. The water- and oil-repellency of both the non- and NaHCO$_3$-treated samples were compared before and after extraction with hexane, and the results are shown in FIG. 7. FIG. 7, panel (A) shows the water gain analysis of the paper samples that was conducted before and after extraction. Uncoated paper water gain was 125 g/m$^2$, which was reduced down to 60 g/m$^2$ for the chitosan-PDMS-coated paper. Similarly, the kit-rating values had increased from 0 to 12 for chitosan-PDMS-coated paper as shown in FIG. 7, panel (B). After extraction with hexane, the water-gain was decreased slightly for both NaHCO$_3$-treated and untreated chitosan-coated paper. On the other hand, the oil-resistance of chitosan-PDMS-coated paper had decreased after extraction with hexane at a 95% confidence level based on Student's t-test. Meanwhile, the water-gain value increased only slightly to 4.2% after extraction with hexane. Some of the PDMS chains may have been physically grafted onto the chitosan and were taken away during extraction with hexane. This presumably physical grafting can occur because of the low reactivity exhibited by —NH$_3$+(due the chitosan solution in acetic acid) towards NCO. However, the NMR spectra of the extracted samples did not show any PDMS peaks in the extract, possibly due to the very low concentration of PDMS (below 0.1 µg/mL). To address the above problem, NaHCO$_3$ treatment was applied to neutralize the protonated —NH$_3$+ groups and thus convert them into —NH$_2$ moieties. As shown in FIG. 7, hexane extraction had virtually no effect on the NaHCO$_3$-treated chitosan-PDMS-coated paper. Thus, NaHCO$_3$ treatment strengthened the oil- and water-resistance of the chitosan-PDMS coatings.

To evaluate the effect of heating on the coated paper, some of the chitosan-PDMS-coated paper samples were dried/cured at room temperature and their water and oil-resistance was compared with those heated at 120° C. for curing to react the PDMS-NCO with the chitosan. The room temperature chitosan-PDMS-coated paper dried/cured at room temperature showed an oil resistance of 4.33/12 after 1 day and 12/12 after 4 days, while water-resistance after 1 day (as well as 4-day) was as good as the samples cured under 120° C. Thus, the omniphobic coatings could be effectively cured under ambient conditions and without the need for elevated temperatures while still providing good water- and oil-resistance properties.

The WVTR values of paper (coated and uncoated) were also measure. The thicknesses of the unmodified paper was 0.108 mm, while for chitosan-coated paper and chitosan-PDMS coated paper, the thickness was 0.127 mm. The WVTR for the uncoated paper was about 2600 g/m$^2$-day, substantially higher than that of coated paper. This may correspond to the porous structure of the uncoated paper that allows easy passage of the water vapors. When a chitosan coating was applied on the surface of paper substrate, most of the pores were covered by a layer of chitosan film, and the WVTR decreased to 726 g/m$^2$-day. The WVTR values were further reduced for chitosan-PDMS coated paper to 716 g/m$^2$-day, likely due to the low surface tension of PDMS that makes the surface more hydrophobic.

Example 2—One-Step Process in External Reaction Medium

Example 2 illustrates the formation of a PDMS-functionalized chitosan polymer in a one-step process in an external reaction medium, which PDMS-functionalized chitosan polymer can then be applied to a porous cellulosic (paper) substrate.

Samples 2.1-2.4: PDMS-g-chitosan as a PDMS-functionalized chitosan polymer was formed using a variety of functionalized formed of PDMS in a one-step fabrication process for use as an omniphobic coating to form water- and grease-resistant paper. For Sample 2.1, PDMS-isocyanate (NCO) was reacted with chitosan in acid-free water to form a PDMS-graft-chitosan with a urea link formation between the amino groups in chitosan and the isocyanate groups in the PDMS. For Sample 2.2, PDMS-isocyanate (NCO) was reacted with chitosan in an organic solvent to form a PDMS-graft-chitosan with a urea link formation between the amino groups in chitosan and the isocyanate groups in the PDMS. For Sample 2.3, PDMS-epoxy was reacted with chitosan in acid-free water to form a PDMS-graft-chitosan with a beta hydroxy amine link formation between the amino groups in chitosan and the epoxide groups in the PDMS. For Sample 2.4, PDMS-methacyrlate was reacted with chitosan in acid-free water to form a PDMS-graft-chitosan with a hydroamination link formation between the amino groups in chitosan and the methacrylate groups in the PDMS. A coating solution was formed by dissolving chitosan (950 mg) and PDMS-graft-Chitosan (20-50 mg) in water (e.g., acetic acid solution in water). The coating solution was applied to a paper substrate and air-dried for 24 h (e.g., before measuring any water and oil resistance properties).

Sample 2.5 (coating paper with PDMS-g-chitosan in a one-step process): PDMS-isocyanate (NCO) was reacted with chitosan in acid-free water to form a PDMS-graft-chitosan with a urea link formation between the amino groups in chitosan and the isocyanate groups in the PDMS. Specifically, acetic acid was added to 0.5 g of chitosan in water. Once clear solution was formed, a NaHCO₃ aqueous solution was added such that pH reached 7. PDMS-NCO was formed by dissolving a polyisocyanate UH80 (hexamethylene diisocyanate trimer (HDIT) available from Sherwin-Williams; 25 mg) in acetone. Then PDMS-amine (NH2) (MW 2K) was added as 600 mg dissolved in 1 ml acetone under stirring on a hot-plate at room temp. The resulting solution was an isocyanate-functionalized PDMS (PDMS-NCO). Then isocyanate was added drop-wise. Once all isocyanate was added, the reaction was stopped and the resulting reaction product was Solution A.

A paper coating was formed by dissolving chitosan (500-950 mg) in water and acetic acid. Then the PDMS-NCO in from Solution A was added to the chitosan in relative amount of ⅕, ⅒, 1/20 for form coating solutions. The coating solutions were applied onto paper and air dried for 24 h before measuring any water and oil resistance properties.

Sample 2.6 (neutral PDMS-g-chitosan for coating): First, 0.5 g of chitosan was dissolved in acid-free water using a known literature method. Then, PDMS-NCO as described above (0.5 g) was added drop-wise. Once the solution and corresponding PDMS-g-chitosan reaction product was obtained, then this PDMS-g-chitosan was mixed with polyvinyl alcohol (PVOH) in 10:90, 20:80, 40:60 wt % ratios and applied on paper. The final concentration of PDMS in the coating remained <20 wt %.

Sample 2.7 (neutral PDMS-g-chitosan for coating): First, 0.5 g of chitosan was dissolved in water and then acetic acid was added in an amount of 2 wt % of the chitosan. Once a clear solution was formed, then NaHCO₃ was added to adjust pH to ~7. Then 0.5 g of the PDMS-NCO as described above was added under stirring to form the corresponding PDMS-g-chitosan reaction product. Then this PDMS-g-chitosan was mixed with PVOH in 10:90, 20:80, 40:60 wt % ratios and applied on paper. The final concentration of PDMS in the coating remained <20 wt %.

Example 3—One-Step Process with Micelles

Example 3 illustrates the formation of a PDMS-functionalized graft chitosan polymer in a one-step process in an external reaction medium to form micelles, which PDMS-functionalized chitosan graft polymer can then be applied to a porous cellulosic (paper) substrate to form an oil- and water-resistant coating. The coated cellulosic substrate can be re-pulped, extracted to remove the PDMS-functionalized chitosan graft polymer, and then re-formed into recycled paper.

Sample 3.1 (PDMS-g-chitosan): An isocyanate-functionalized PDMS (PDMS-NCO) stock solution was prepared by dropwise adding amino-functionalized PDMS (PDMS-NH2) solution (133 mg PDMS-NH2 with a molecular weight of about 2000 in 1 ml acetone) into hexane 1,6-diisocyanate trimer (HDIT) solution (67 mg HDIT in 1 ml acetone) under stirring. The concentration of obtained PDMS-NCO solution was recorded as 10 wt. %. A series of PDMS-NCO solutions with a constant volume (0.5 ml) containing various amounts (12.5, 25, 50 and 100 mg) of PDMS-NCO was prepared by mixing appropriate amounts of PDMS-NCO stock solution and acetone.

A chitosan stock solution was prepared by dissolving 4 g chitosan in a 2% (v/v) acetic acid solution to make a volume of 100 ml, followed by stirring for 24 hours. To make a corresponding chitosan solution, 3.5 ml distilled water was added into 2.5 ml chitosan stock solution, and the obtained solution containing 100 mg chitosan, with a concentration chitosan of about 1.67%.

The PDMS-NCO solution was added dropwise into the chitosan solution and stirred for 5 minutes. The obtained solution included the graft reaction product between the PDMS-NCO and the chitosan (PDMS-g-chitosan) in an aqueous suspension. Dynamic light scattering of the resulting suspension confirmed that the PDMS-g-chitosan was present in micelle form, with the micelles ranging size from about 70-400 nm, with a number-average size in a range from about 100-200 nm.

Sample 3.2 (PDMS-g-chitosan): A hydroxy-functionalized PDMS PDMS-OH; 1 g) and HDIT (180 mg) were dissolved in acetone (2 ml) followed by mixing using a vortex mixer for 30 seconds. Then 1 drop of Tin II octanoate (5 mg) was added into the mixture as a catalyst. The reaction was performed under stirring for 12 hours at room temperature. The obtained solution was a PDMS-NCO stock solution. PDMS-g-chitosan with various amounts of PDMS-NCO was prepared as described above for Sample 3.1.

Sample 3.3 (Castor oil-g-chitosan): An isocyanate-functionalized castor oil (castor oil-NCO) was prepared in a manner similar to that described for Sample 3.2 to functionalize and replace the hydroxy groups normally present in castor oil with isocyanate groups. Then various amounts of NCO-castor oil (100, 200 and 300 mg) were added into 0.5 ml acetone, followed by vortexing for 1 minute. NCO-castor oil was then dropwise added into chitosan solution (100 mg chitosan in 6 ml solution prepared in the same approach as in Sample 3.1). The obtained mixture was stirred for 24 hours under room temperature to allow thorough reaction between chitosan and NCO-castor oil, thereby forming the graft reaction product between the NCO-castor oil and the chitosan (Castor oil-g-chitosan) in an aqueous suspension.

Coatings application: The aqueous dispersions containing omniphobic polymeric micelles according to Samples 3.1-3 above were applied to various paper substrates including printing paper, unbleached Kraft paper, bleached Kraft paper and paperboard for coating. Paper substrates were dipped into the coating solutions according to Samples 3.1-3, followed by drying in an oven under 70° C. for 24 hours.

Oil and water droplet tests: For each of the coated paper substrates, a large droplet of water or oil was added to the coating surface, and samples were covered with a petri dish to reduce evaporation of water and contamination of dust. For PDMS-g-chitosan using PDMS-NH2 as starting material (Sample 3.1), the effect of different PDMS:chitosan ratios was investigated, including 1:8, 1:16, 1:32, and 1:64 (w/w). All samples showed good oil resistant properties and excellent water contact angles, even at a very low PDMS content of about 1.54 wt. % (1:64 PDMS:chitosan ratio). For PDMS-g-chitosan using PDMS-OH as starting material (Sample 3.2), all samples showed great oil resistances to castor oil up to 24 hours at PDMS:chitosan ratios of 1:8, 1:2, 1:1, and 2:1 (w/w), which could be further improved by applying a thicker coating. For short contact times of about 5 minutes, all formulations showed good water resistance as well, with the 2:1 PDMS:chitosan coating showing the best water resistance at longer contact times. For Castor oil-g-chitosan (Sample 3.3), all samples showed great oil resistances to castor oil up to 24 hours at a PDMS:chitosan ratio of 1:1 (w/w). The resistance property against water was affected by both NCO-castor oil and the nature of paper substrate, with the samples generally having good water resistance for contact times up to 60 minutes.

Paper sealing test: PDMS-g-chitosan mixtures and chitosan solutions, both as described above for Sample 3.1, were applied as a sealing glue between two paper substrates. In some cases, two paper substrates each with a PDMS-g-chitosan coating were used, and the glue was applied between the coated surfaces of each. In other cases, one paper substrate with a PDMS-g-chitosan coating and one uncoated paper substrate were used, and the glue was applied between the coated and uncoated surfaces of each. In both cases, the joined/glued substrates were stored for 24 hour at 70° C., and then the water resistance of the resulting sealing was tested by adding one large drop of water on the seal for 24 hours. The results indicated that both PDMS-g-chitosan mixtures and chitosan solutions could be applied as a glue for sealing, and the PDMS-g-chitosan showed better water resistance than chitosan. However, PDMS-g-chitosan did not have a good wettability on an existing PDMS-g-chitosan substrate coating, possibly as a result of the smooth surface of the existing coating and corresponding poor adhesion. Further, both glues showed better performance between coated/uncoated substrates due to the porous structure of the uncoated paper. In any case, it was shown that coated paper is sealable and thus can be used in the preparation of disposable paper-based items, such as cups or other food-service items.

Example 4—Functionalized Vegetable Oil Omniphobic Polymer

Example 4 illustrates the formation of a omniphobic-functionalized chitosan polymer in which expodized sunflower oil is used as an illustrative functionalized vegetable oil and corresponding functionalized omniphobic polymer. The sunflower oil-functionalized chitosan polymer can then be applied to a porous cellulosic (paper) substrate.

Synthesis of chitosan-sunflower oil: Epoxidized sunflower oil was prepared by dissolving sunflower oil in dichloromethane in a round-bottom flask. 3-chloroperbenzoic acid (m-CPBA) was dissolved in dichloromethane separately. The m-CPBA solution was further added to the sunflower oil solution under constant stirring. The solution was stirred for 1 h at room temperature. The extraction was performed with water. The crude solution was dried on $Na_2SO_4$. Dichloromethane was evaporated using a rotavapor. The final product was weighed and characterized by NMR before use. Epoxidized sunflower oil (1.0 g) was then grafted onto chitosan (1.0 g) by a nucleophile-assisted ring-opening mechanism of the epoxide ring. In the first step, epoxide ring gets protonated from acetic acid that is present in the reaction medium, then the terminal amino group attacks on the ring to open it and form an amino alcohol. Once the reaction was complete, the product was not isolated. Instead the solution was used as-is to coat a paper substrate.

Water and oil contact angles were measured to characterize the behavior of omniphobic coated papers on contact with water. The contact angles were taken at 30 s and 5 min to characterize the difference in the angle after certain time of contact. The uncoated paper showed a water contact angle (WCA) of 53.5±1.38° after 30 s, which decreased to 0° after 5 min with disappearance of water droplet. In case of chitosan coated paper, a WCA of 96.1±5.85° was observed, which angle decreased after 5 min to 87.4±1.85°. The increase in angle is due to increase in surface roughness on coating with chitosan, which helps in holding up the water droplet. Similar trends were observed for oil contact angle (OCA). Uncoated paper showed a lower OCA of 7.2±0.70° after 5 min, whereas the omniphobic coated paper showed an increase in OCA with a value of 43.7±0.70° at 5 min. The Cobb60 value and kit rating value were found to be 8.0 and 12 respectively for the omniphobic coated paper.

Example 5—Polyethylene Imine Amino-Functional Polymer

Example 5 illustrates the use of polyethylene imine (PEI) as the amino-functional polymer to form a corresponding omniphobic composition by reaction with isocyanate-functionalized PDMS. The PDMS-functionalized PEI polymer can be used as an omniphobic coating porous cellulosic (paper) substrate to a coated substrate with good release (i.e., non-stick) properties.

Omniphobic coated paper having PDMS as an omniphobic group have shown excellent release properties due to low surface energy of the PDMS chains. Ice and frozen substrates (e.g., foodstuffs such as meat, vegetables) do not stick to a PDMS surface. Samples were prepared to evaluate the release liner performance of omniphobic compositions according to the disclosure using a two-step coating process. Polyethylene imine (PEI) and polyvinyl alcohol (PVOH) were mixed (1:2 w/w PEI:PVOH) and applied onto paper. The polymer coating was allowed to air-dry, and then the coating was treated with PDMS-NCO (10 mg/ml acetone solution). The samples treated with PDMS-NCO were air-dried to all reaction between the amine groups of PEI and isocycanate groups of PDMS-NCO, and the samples were then evaluated for their release properties. For the release properties, meat was applied to the paper and put in freezer. After 2 days in the freezer, the coated paper showed release properties (i.e., force required to separate the meat from paper) comparable to that of a commercial release liner.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. A method for forming an omniphobic coated article, the method comprising:
   providing a porous substrate; and
   applying an omniphobic coating to the porous substrate, the omniphobic polymeric coating comprising a reaction product between (i) an amino-functional polymer comprising a plurality of amino groups and (ii) at least one functionalized omniphobic polymer having a glass transition temperature ($T_g$) of 60° C. or less, the functionalized omniphobic polymer comprising a functional group reactive with the amino groups of the amino-functional polymer;
   wherein:
      the omniphobic coating has a weight ratio of amino-functional polymer relative to functionalized omniphobic polymer in a range from 2 to 20; and
      the omniphobic coating has an amino-functional polymer content in a range from about 0.1 wt. % to 20 wt. % relative to the porous substrate.

2. The method of claim 1, wherein the porous substrate comprises a porous cellulosic substrate.

3. The method of claim 2, wherein the cellulosic substrate is selected from the group of paper, corrugated board, cardboard, wood, and fabric.

4. The method of claim 2, wherein the cellulosic substrate is in the form of a food-service article selected from the group consisting of a drinking cup, a food plate, and a food wrapper.

5. The method of claim 2, wherein the cellulosic substrate is in the form of a packaging box.

6. The method of claim 1, wherein the amino-functional polymer comprises chitosan.

7. The method of claim 1, wherein the amino-functional polymer comprises polyethylene imine (PEI).

8. The method of claim 1, wherein applying the omniphobic coating to the porous substrate comprises:
   applying an amino-functional polymer coating to the porous substrate, the amino-functional polymer coating optionally comprising cationic ammonium groups;
   optionally neutralizing the amino-functional polymer coating, thereby converting at least some of the cationic ammonium groups to amino groups and providing a neutralized amino-functional polymer coating;
   applying the functionalized omniphobic polymer to the amino-functional polymer coating; and
   reacting the amino groups of the amino-functional polymer coating with the functional groups of the functionalized omniphobic polymer to form an omniphobic coating on the porous substrate.

9. The method of claim 8, wherein applying the amino-functional polymer coating to the porous substrate comprises:
   applying to the porous substrate an amino-functional polymer mixture comprising (i) the amino-functional polymer, and (ii) water; and
   drying the porous substrate, thereby removing at least some of the water from the amino-functional polymer mixture and forming the amino-functional polymer coating on the porous substrate.

10. The method of claim 8, wherein:
    the amino-functional polymer coating comprises the cationic ammonium groups; and
    neutralizing the amino-functional polymer coating is performed and comprises contacting the amino-functional polymer coating with a neutralizing agent.

11. The method of claim 8, wherein applying the functionalized omniphobic polymer comprises:
    applying to the amino-functional polymer coating a mixture comprising (i) the functionalized omniphobic polymer, and (ii) a solvent.

12. The method of claim 11, further comprising:
    after applying the functionalized omniphobic polymer to the amino-functional polymer coating, drying the coated substrate to remove the solvent.

13. The method of claim 8, wherein reacting the amino groups of the amino-functional polymer coating with the functional groups of the functionalized omniphobic polymer comprises exposing the coated substrate (i) to a temperature from 0° C. to 180° C. and (ii) for a time from 10 min to 10 days.

14. The method of claim 1, wherein applying the omniphobic coating to the porous substrate comprises:
    reacting the amino groups of the amino-functional polymer with the functional groups of the functionalized omniphobic polymer in a liquid reaction medium to form an omniphobic polymer reaction product;
    applying the omniphobic polymer reaction product to the porous substrate; and
    drying the porous substrate, thereby forming the omniphobic coating to the porous substrate.

15. The method of claim 1, wherein applying the omniphobic coating to the porous substrate comprises:
    providing an aqueous dispersion comprising omniphobic polymeric micelles dispersed therein, the omniphobic polymeric micelles comprising the reaction product between the amino-functional polymer and the functionalized omniphobic polymer;
    applying the aqueous dispersion comprising the omniphobic polymeric micelles to the porous substrate; and
    drying the porous substrate, thereby forming an omniphobic coating comprising the reaction product on the porous substrate.

16. The method of claim 1, wherein the omniphobic coating further comprises one or more additives selected from the group consisting of nanoclay, graphene oxide, graphene, silicon dioxide (silica), aluminum oxide, cellulose nanocrystals, carbon nanotubes, titanium dioxide (titania), diatomaceous earth, biocides, pigments, dyes, thermoplastics, and combinations thereof.

17. The method of claim 1, wherein the functionalized omniphobic polymer is selected from the group consisting of functionalized polysiloxanes, functionalized polyperfluoroethers, functionalized polybutadienes, functionalized polyisobutenes, functionalized branched polyolefins, functionalized poly(meth)acrylates, functionalized polyesters, functionalized vegetable oils, and combinations thereof.

18. The method of claim 1, wherein the functionalized omniphobic polymer comprises a mono-functional functionalized omniphobic polymer.

19. The method of claim 1, wherein the functionalized omniphobic polymer comprises a di-functional functionalized omniphobic polymer.

20. The method of claim 1, wherein the functionalized omniphobic polymer comprises a poly-functional functionalized omniphobic polymer.

21. The method of claim 1, wherein the functionalized omniphobic polymer has a glass transition temperature in a range from −150° C. to 60° C.

22. The method of claim 1, wherein the functionalized omniphobic polymer is a liquid at a temperature at 70° C. or below.

23. The method of claim 1, wherein the functionalized omniphobic polymer has a molecular weight ranging from 300 to 300,000 g/mol.

24. The method of claim 1, wherein the functional group of the functionalized omniphobic polymer is selected from the group consisting of isocyanate groups, epoxy groups, vinyl groups, aldehyde groups, anhydride groups, and combinations thereof.

25. The method of claim 1, wherein the functionalized omniphobic polymer comprises an isocyanate-functionalized polysiloxane.

26. The method of claim 25, wherein the isocyanate-functionalized polysiloxane comprises a reaction product of an amine-functionalized polysiloxane and a polyisocyanate.

27. The method of claim 26, wherein the polyisocyanate is selected from the group consisting of 1,5-naphthylene diisocyanate, 4,4'-diphenylmethane diisocyanate (MDI), hydrogenated MDI, xylene diisocyanate (XDI), tetramethylxylol diisocyanate (TMXDI), 4,4'-diphenyl-dimethyl-methane diisocyanate, di- and tetraalkyl-diphenylmethane diisocyanate, 4,4'-dibenzyl diisocyanate, 1,3-phenylene diisocyanate, 1,4-phenylene diisocyanate, one or more isomers of tolylene diisocyanate (TDI), 1-methyl-2,4-diiso-cyanato-cyclohexane, 1,6-diisocyanato-2,2,4-trimethyl-hexane, 1,6-diisocyanato-2,4,4-trimethylhexane, 1-iso-cyanatomethyl-3-isocyanato-1,5,5-trimethylcyclohexane, chlorinated and brominated diisocyanates, phosphorus-containing diisocyanates, 4,4'-diisocyanatophenyl-perfluoroethane, tetramethoxybutane 1,4-diisocyanate, butane 1,4-diisocyanate, hexane 1,6-diisocyanate (HDI), HDI dimer (HDID), HDI trimer (HDIT), HDI biuret, 1,5-pentamethylene diisocyanate (PDI), PDID (dimer of PDI), PDIT (trimer of PDI), PDI biuret, dicyclohexylmethane diisocyanate, cyclohexane 1,4-diisocyanate, ethylene diisocyanate, phthalic acid bisisocyanatoethyl ester, 1-chloromethylphenyl 2,4-diisocyanate, 1-bromomethylphenyl 2,6-diisocyanate, 3,3-bischloromethyl ether 4,4'-diphenyldiisocyanate, trimethylhexamethylene diisocyanate, 1,4-diisocyanato-butane, 1,2-diisocyanatododecane, and combinations thereof.

28. The method of claim 1, wherein the omniphobic coating has a functionalized omniphobic polymer content in a range from about 0.1 wt. % to 10 wt. % relative to the porous substrate.

29. The method of claim 1, wherein the omniphobic coating has a molar ratio of amino-functional polymer amino groups relative to graft or crosslinking linkages with the functionalized omniphobic polymer in a range from 1 to 30.

30. The method of claim 1, wherein the omniphobic coating has a water contact angle in a range from 90° to 120°.

31. The method of claim 1, wherein the omniphobic coating has an oil contact angle in a range from 1° to 65°.

32. The method of claim 1, wherein the omniphobic coating has a water sliding angle in a range from 1° to 30° for a 75 µl droplet.

33. The method of claim 1, wherein the omniphobic coating is resistant to the spreading of oil on its surface.

34. The method of claim 1, wherein the omniphobic coating has a thickness ranging from 0.01 µm to 500 µm.

35. The method of claim 1, wherein the omniphobic coated article has a relative permeability for water vapor of 0.7 or less, relative to a corresponding porous substrate without the omniphobic coating thereon.

36. The method of claim 1, wherein the omniphobic coated article has a relative uptake for liquid water of 0.7 or less, relative to a corresponding porous substrate without the omniphobic coating thereon.

37. The method of claim 1, wherein the omniphobic coated article has a kit rating of 7 to 12, as determined by TAPPI Standard Method T 599 pm-96.

38. An omniphobic coated article, comprising:
a porous substrate; and
an omniphobic coating on the porous substrate formed by the method of claim 1.

39. A method for forming an omniphobic coated article, the method comprising:
providing an aqueous dispersion comprising omniphobic polymeric micelles dispersed therein, the omniphobic polymeric micelles comprising a reaction product between (i) an amino-functional polymer comprising a plurality of amino groups and (ii) at least one functionalized omniphobic polymer having a glass transition temperature ($T_g$) of 60° C. or less, the functionalized omniphobic polymer comprising a functional group reactive with the amino groups of the amino-functional polymer;
applying the aqueous dispersion comprising the omniphobic polymeric micelles to a porous substrate; and
drying the porous substrate, thereby forming an omniphobic coating comprising the reaction product on the porous substrate;
wherein the omniphobic coating has an amino-functional polymer content in a range from about 0.1 wt. % to 20 wt. % relative to the porous substrate.

40. An omniphobic coated article, comprising:
a porous substrate; and
an omniphobic coating on the porous substrate formed by the method of claim 39.

41. An omniphobic coated article comprising:
a porous substrate; and
an omniphobic polymer coating on the porous substrate, the omniphobic polymeric coating comprising a reaction product between (i) an amino-functional polymer comprising a plurality of amino groups and (ii) at least one functionalized omniphobic polymer having a glass transition temperature ($T_g$) of 60° C. or less, the functionalized omniphobic polymer comprising a functional group reactive with the amino groups of the amino-functional polymer;
wherein the omniphobic polymeric coating is capable of forming an aqueous dispersion of micelles formed from the omniphobic polymeric coating upon aqueous extraction of the omniphobic coated article under suitable pH conditions.

* * * * *